12) United States Patent
Ellison

(10) Patent No.: US 8,598,055 B2
(45) Date of Patent: *Dec. 3, 2013

(54) BOROALUMINO SILICATE GLASSES

(75) Inventor: Adam James Ellison, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 543 days.

This patent is subject to a terminal disclaimer.

(21) Appl. No.: 12/470,968

(22) Filed: May 22, 2009

(65) Prior Publication Data

US 2009/0294773 A1  Dec. 3, 2009

Related U.S. Application Data

(60) Provisional application No. 61/130,474, filed on May 30, 2008.

(51) Int. Cl.
*C03C 3/091* (2006.01)

(52) U.S. Cl.
USPC .............. 501/66; 501/56; 501/59; 501/64; 501/67

(58) Field of Classification Search
USPC ................... 501/66, 56, 59, 64, 67
See application file for complete search history.

(56) References Cited

U.S. PATENT DOCUMENTS

| | | | | |
|---|---|---|---|---|
| 5,116,788 | A | 5/1992 | Dumbaugh, Jr. | 501/66 |
| 5,244,847 | A | 9/1993 | Kushitani et al. | 501/66 |
| 5,508,237 | A | 4/1996 | Moffatt et al. | 501/69 |
| 5,801,109 | A | 9/1998 | Nishizawa et al. | 501/66 |
| 5,851,939 | A | 12/1998 | Miwa | 501/70 |
| 5,885,914 | A * | 3/1999 | Nishizawa et al. | 501/66 |
| 6,060,168 | A | 5/2000 | Kohli | 428/428 |
| 6,169,047 | B1 | 1/2001 | Nishizawa et al. | 501/66 |
| 6,319,867 | B1 * | 11/2001 | Chacon et al. | 501/66 |
| 6,417,124 | B1 * | 7/2002 | Peuchert et al. | 501/66 |
| 6,537,937 | B1 * | 3/2003 | Nishizawa et al. | 501/66 |
| 6,831,029 | B2 | 12/2004 | Chacon et al. | 501/66 |
| 6,867,158 | B2 | 3/2005 | Peuchert et al. | 501/67 |
| RE38,959 | E | 1/2006 | Kohli | 428/428 |
| 7,534,734 | B2 * | 5/2009 | Ellison | 501/66 |
| 7,709,406 | B2 * | 5/2010 | Cornelius et al. | 501/70 |
| 7,833,919 | B2 * | 11/2010 | Danielson et al. | 501/66 |
| 7,851,394 | B2 * | 12/2010 | Ellison | 501/66 |
| 2004/0209758 | A1 | 10/2004 | Peuchert et al. | 501/66 |
| 2006/0160691 | A1 * | 7/2006 | Kawaguchi et al. | 501/66 |
| 2006/0293162 | A1 * | 12/2006 | Ellison | 501/66 |
| 2007/0027019 | A1 * | 2/2007 | Nishizawa et al. | 501/65 |
| 2007/0191207 | A1 * | 8/2007 | Danielson et al. | 501/66 |
| 2008/0076656 | A1 * | 3/2008 | Suzuki et al. | 501/53 |
| 2008/0110208 | A1 | 5/2008 | Ellison | 65/90 |

FOREIGN PATENT DOCUMENTS

| | | | |
|---|---|---|---|
| CN | 1648087 | 8/2005 | |
| DE | 19939789 | 2/2001 | ............. C03B 3/091 |
| DE | 10000839 | 5/2001 | ............. C03B 3/091 |
| EP | 0714862 | 3/1999 | ............. C03C 3/085 |
| EP | 0576362 | 8/1999 | ............. C03C 3/091 |
| EP | 1705160 | 9/2006 | ............. C03C 3/091 |
| EP | 1911725 | 4/2008 | ............. C03B 5/225 |
| JP | 9-169539 | 6/1997 | ............. C03C 3/091 |
| JP | 9-263421 | 10/1997 | ............. C03C 3/087 |
| JP | HEI 10-(1998)45422 | 2/1998 | ............. C03C 3/085 |
| JP | 10-072237 | 3/1998 | ............. C03B 3/091 |
| JP | HEI 10-139467 | 5/1998 | ............. C03C 3/078 |
| JP | HEI 10-(1998)324526 | 12/1998 | ............. C03B 5/225 |
| JP | 2004168597 | 6/2004 | ............. C03C 3/091 |
| JP | 2005-330176 | 12/2005 | ............. C03B 3/089 |
| KR | 2006-0090175 | 8/2006 | |

* cited by examiner

*Primary Examiner* — Karl Group
*Assistant Examiner* — Elizabeth A Bolden
(74) *Attorney, Agent, or Firm* — Maurice M. Klee; Thomas R. Beall

(57) ABSTRACT

Disclosed are alkali-free glasses having a liquidus viscosity of greater than or equal to about 90,000 poises, said glass comprising $SiO_2$, $Al_2O_3$, $B_2O_3$, MgO, CaO, and SrO such that, in mole percent on an oxide basis: $64 \leq SiO_2 \leq 68.2$; $11 \leq Al_2O_3 \leq 13.5$; $5 \leq B_2O_3 \leq 9$; $2 \leq MgO \leq 9$; $3 \leq CaO \leq 9$; and $1 \leq SrO \leq 5$. The glasses can be used to make a display glass substrates, such as thin film transistor (TFT) display glass substrates for use in active matrix liquid crystal display devices (AMLCDs) and other flat panel display devices.

15 Claims, 2 Drawing Sheets

BOROALUMINO SILICATE GLASSES

CROSS-REFERENCE TO RELATED APPLICATION

This application claims the benefit of priority to U.S. provisional application No. 61/130,474, filed on May 30, 2008 and entitled "BOROALUMINO SILICATE GLASSES," the content of which is relied upon and incorporated herein by reference in its entirety.

TECHNICAL FIELD

The present invention relates, generally, to glasses and, more particularly, to boroalumino silicate glasses and to methods for making and using same.

BACKGROUND

Displays may be broadly classified into one of two types: emissive (e.g., CRTs and plasma display panels (PDPs)) or non-emissive. This latter family, to which liquid crystal displays (LCDs) belong, relies upon an external light source, with the display only serving as a light modulator. In the case of liquid crystal displays, this external light source may be either ambient light (used in reflective displays) or a dedicated light source (such as found in direct view displays).

Liquid crystal displays rely upon three inherent features of liquid crystal (LC) materials to modulate light. The first is the ability of LC materials to cause optical rotation of polarized light. Second is the dependence of such rotation on the mechanical orientation of the liquid crystal. Third is the ability of the liquid crystal to undergo mechanical orientation by the application of an external electric field.

In the construction of a simple, twisted nematic (TN) liquid crystal display, two substrates surround a layer of liquid crystal material. In a display type known as Normally White, the application of alignment layers on the inner surfaces of the substrates creates a 90° spiral of the liquid crystal director. This means that the polarization of linearly polarized light entering one face of the liquid crystal cell will be rotated 90° by the liquid crystal material. Polarization films, oriented 90° to each other, are placed on the outer surfaces of the substrates.

Light, upon entering the first polarization film becomes linearly polarized. Traversing the liquid crystal cell, the polarization of this light is rotated 90° and is allowed to exit through the second polarization film. Application of an electric field across the liquid crystal layer aligns the liquid crystal directors with the field, interrupting its ability to rotate light. Linearly polarized light passing through this cell does not have its polarization rotated and hence is blocked by the second polarization film. Thus, in the simplest sense, the liquid crystal material becomes a light valve, whose ability to allow or block light transmission is controlled by the application of an electric field.

The above description pertains to the operation of a single pixel in a liquid crystal display. High information type displays require the assembly of several million of these pixels, which are referred to in the art as sub pixels, into a matrix format. Addressing all of these sub pixels, i.e., applying an electric field to all of these sub pixels, while maximizing addressing speed and minimizing cross-talk presents several challenges. One of the preferred ways to address sub pixels is by controlling the electric field with a thin film transistor located at each sub pixel, which forms the basis of active matrix liquid crystal display devices (AMLCDs).

The manufacturing of these displays is extremely complex, and the properties of the substrate glass can be extremely important when producing displays having optimal performance. We have described some suitable substrate glasses in U.S. Pat. No. 6,060,168 to Kohli, U.S. Pat. No. 6,319,867 to Chacon et al., U.S. Pat. No. 6,831,029 to Chacon et al., and U.S. Pat. No. RE38,959 to Kohli. However, a need for glasses that can be used as substrates in the manufacture of active matrix liquid crystal display devices (AMLCDs) and other flat panel displays continues to exist, and the present invention is directed, in part, to addressing this need.

One technical issue facing the glass substrates for LCD displays, especially those displays made by high-temperature processes such as polysilicon technology, is the density change (compaction, or thermal stability) of the glass sheets after they are subjected to high-temperature treatment steps. The compaction of the glass sheets can lead to lack of registration of the semiconductor features created on the surface of the substrates, hence lower-quality or defective displays. Thermal stability of the glass sheet is dependent on the glass composition and thermal history thereof. Whereas a rigorously annealed glass sheet would have less compaction in down-stream processing, obtaining such thermodynamically stable glass sheet is difficult and could incur prohibitive costs to the manufacture process by requiring either a secondary heat treatment and/or a low production rate. It has been found that anneal point of the glass material correlates with the thermal stability of a glass sheet. For glass sheets produced by a given thermal process, the higher the anneal point of the glass material, the less the compaction of the glass sheets made therefrom.

The present invention addresses the various technical issues discussed supra.

SUMMARY

The present invention relates to an alkali-free glass having a liquidus viscosity of greater than or equal to about 90,000 poises, said glass comprising $SiO_2$, $Al_2O_3$, $B_2O_3$, MgO, CaO, and SrO such that, in mole percent on an oxide basis:

$64 \leq SiO_2 \leq 68.2$;

$11 \leq Al_2O_3 \leq 13.5$;

$5 \leq B_2O_3 \leq 9$;

$2 \leq MgO \leq 9$;

$3 \leq CaO \leq 9$; and $1 \leq SrO \leq 5$.

These and additional features and embodiments of the present invention will be more fully illustrated and discussed in the following drawings and detailed description.

DETAILED DESCRIPTION

Figure 1:
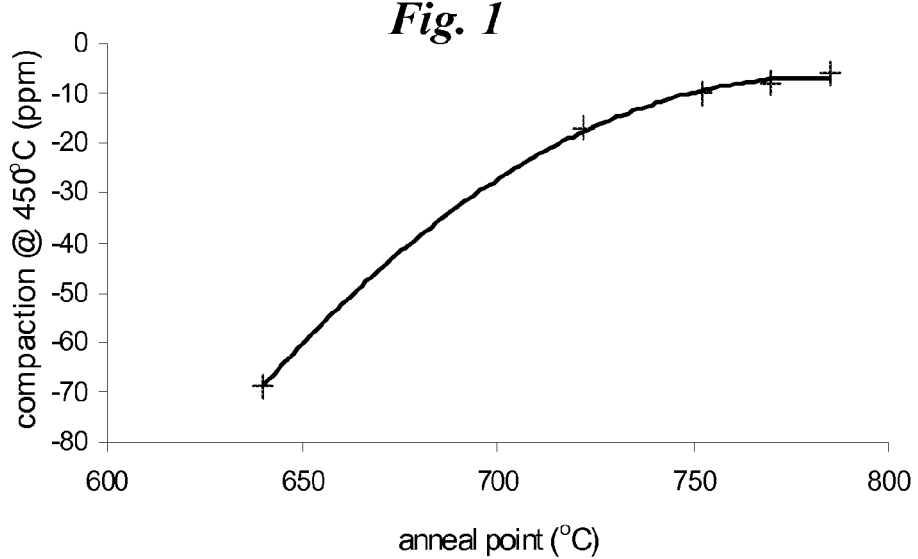
FIG. 1 is a graph showing compaction after one hour at 450° C. for glasses with a range of anneal points.

Before the present materials, articles, and/or methods are disclosed and described, it is to be understood that the aspects described below are not limited to specific materials, preparative methods, or uses, but is to be understood to be illustrative of the invention. It is also to be understood that the terminology used herein is for the purpose of describing particular aspects only and is not intended to be limiting.

Throughout this specification and claims, unless the context requires otherwise, the word "comprise" or variations, such as "comprises" or "comprising", will be understood to imply the inclusion of a stated element but not the exclusion of any other element or group of elements.

It must be noted that, as used in the specification and the appended claims, the singular forms "a", "an", and "the" include plural referents unless the context clearly dictates otherwise. Thus, for example, reference to "a fining agent" is meant to include mixtures of two or more such fining agents; reference to "the glass former" is meant to include mixtures of two or more such glass formers; and the like.

"Optional" or "optionally" means that the subsequently described event or circumstance can or cannot occur, and that the description includes instances where the event or circumstance occurs and instances where it does not.

When values are expressed as approximations, e.g., by use of the antecedent "about" as in "'about' a particular value", it will be understood that the particular value forms another aspect of the invention. Ranges may be expressed herein as "from 'about' one particular value to 'about' another particular value", as "less than 'about' a particular value", as "'about' a particular value or greater", etc. When such ranges are expressed, another aspect of the invention includes "from the one particular value to the other particular value", "less than the particular value", and "the particular value or greater", respectively. It will be further understood that the endpoints of each of the ranges are significant both in relation to the other endpoint, and independently of the other endpoint; and, in cases where no lower endpoint is stated in a range, the lower endpoint is meant to be and include zero.

A weight percent of a component, unless specifically stated to the contrary, is based on the total weight of the formulation or composition in which the component is included. Similarly, a mole percent of a component, unless specifically stated to the contrary, is based on the total number of moles of all components in the formulation or composition in which the component is included.

As discussed above, the present invention relates to an alkali-free glass that includes $SiO_2$, $Al_2O_3$, $B_2O_3$, $MgO$, $CaO$, and $SrO$, and the glass can further include a variety of other components. The $SiO_2$, $Al_2O_3$, $B_2O_3$, $MgO$, $CaO$, $SrO$, and other components (if any) are chosen such that the glass includes, as calculated in mole percent on an oxide basis: 64-68.2$SiO_2$, 11-13.5$Al_2O_3$, 5-9$B_2O_3$, 2-9, $MgO$, 3-9$CaO$, and 1-5$SrO$.

As used herein, "alkali-free" means that the glass (i) is essentially free of intentionally added alkali metal oxide, for example, to avoid the possibility of having a negative impact on thin film transistor (TFT) performance through diffusion of alkali ions from the glass into the silicon of the TFT; (ii) contains a total of less than about 0.1 mol % of alkali metal oxides; or (iii) both.

In certain embodiments, the glass includes, as calculated in mole percent on an oxide basis, 64-68$SiO_2$. In certain embodiments, the glass includes, as calculated in mole percent on an oxide basis, 11.3-13.5$Al_2O_3$.

In certain embodiments, the glass satisfies one or more of the following expressions:

$1.05 \le (MgO+CaO+SrO)/Al_2O_3 \le 1.45$;

$0.67 \le (SrO+CaO)/Al_2O_3 \le 0.92$; and $0.45 \le CaO/(CaO+SrO) \le 0.95$.

For example, in certain embodiments, the glass satisfying the above immediate requirements further has a liquidus temperature of lower than or equal to about 1200° C., and a melting temperature of lower than or equal to about 1620° C.

For example, in certain embodiments, the glass satisfies the first of the aforementioned expressions ($1.05 \le (MgO+CaO+SrO)/Al_2O_3 \le 1.45$). In certain embodiments, the glass satisfies the second of the aforementioned expressions ($0.67 \le (SrO+CaO)/Al_2O_3 \le 0.92$). In certain embodiments, the glass satisfies the third of the aforementioned expressions ($0.45 \le CaO/(CaO+SrO) \le 0.95$). In certain embodiments, two or more of the aforementioned expressions are satisfied. In certain embodiments, all three of the aforementioned expressions are satisfied. By way of further illustration, in certain embodiments, the glass satisfies all three of the following expressions:

$1.05 \le (MgO+CaO+SrO)/Al_2O_3 \le 1.3$;

$0.72 \le (SrO+CaO)/Al_2O_3 \le 0.9$; and $0.55 \le CaO/(CaO+SrO) \le 0.95$, such as in the case where the glass satisfies all three of the following expressions:

$1.05 \le (MgO+CaO+SrO)/Al_2O_3 \le 1.3$;

$0.72 \le (SrO+CaO)/Al_2O_3 \le 0.9$; and $0.8 \le CaO/(CaO+SrO) \le 0.95$.

The glasses of the present invention (e.g., any of the glasses discussed above) can further include a variety of other components.

For example, the glasses of the present invention can further include $SnO_2$, $Fe_2O_3$, $CeO_2$, $As_2O_3$, $Sb_2O_3$, Cl, Br, or combinations thereof These materials can be added as fining agents (e.g., to facilitate removal of gaseous inclusions from melted batch materials used to produce the glass) and/or for other purposes. In certain embodiments, the glasses of the present invention (e.g., any of the glasses discussed above) further include $SnO_2$ (e.g., as calculated in mole percent on an oxide basis, 0.02-0.3$SnO_2$, etc.) and $Fe_2O_3$ (e.g., as calculated in mole percent on an oxide basis, 0.005-0.08$Fe_2O_3$, 0.01-0.08$Fe_2O_3$, etc.). By way of illustration, in certain embodiments, the alkali-free glass of the present invention further includes $SnO_2$ and $Fe_2O_3$, wherein, in mole percent on an oxide basis:

$0.02 \le SnO_2 \le 0.3$; and $0.005 \le Fe_2O_3 \le 0.08$.

In certain embodiments, the glasses of the present invention include less than 0.05% (e.g., less than 0.04%, less than 0.03%, less than 0.02%, less than 0.01%, etc.) by weight of $Sb_2O_3$, $As_2O_3$, or combinations thereof. In certain embodiments, the glasses of the present invention further include $SnO_2$, $Fe_2O_3$, $CeO_2$, Cl, Br, or combinations thereof and include less than 0.05% (e.g., less than 0.04%, less than 0.03%, less than 0.02%, less than 0.01%, etc.) by weight of Sb$_2$O$_3$, As$_2$O$_3$, or combinations thereof. In certain embodiments, the glasses of the present invention further include SnO$_2$ and Fe$_2$O$_3$ and include less than 0.05% (e.g., less than 0.04%, less than 0.03%, less than 0.02%, less than 0.01%, etc.) by weight of Sb$_2$O$_3$, As$_2$O$_3$, or combinations thereof. In certain embodiments, the alkali-free glasses of the present invention further include SnO$_2$ and Fe$_2$O$_3$, wherein, in mole percent on an oxide basis:

$$0.02 \leq SnO_2 \leq 0.3; \text{ and}$$

$$0.005 \leq Fe_2O_3 \leq 0.08,$$

and include less than 0.05% (e.g., less than 0.04%, less than 0.03%, less than 0.02%, less than 0.01%, etc.) by weight of Sb$_2$O$_3$, As$_2$O$_3$, or combinations thereof.

The glasses of the present invention (e.g., any of the glasses discussed above) can include F, Cl, or Br, for example, as in the case where the glasses further include Cl and/or Br as fining agents. For example, the glass can include fluorine, chlorine, and/or bromine, wherein, as calculated in mole percent: F+Cl+Br$\leq$0.4, such as where F+Cl+Br$\leq$0.3, F+Cl+Br$\leq$0.2, F+Cl+Br$\leq$0.1, 0.001$\leq$F+Cl+Br$\leq$0.4, and/or 0.005$\leq$F+Cl+Br$\leq$0.4. By way of illustration, in certain embodiments, the glass further includes SnO$_2$ and Fe$_2$O$_3$ and, optionally, fluorine, chlorine, and/or bromine, such that, as calculated in mole percent on an oxide basis: 0.02$\leq$SnO$_2$$\leq$0.3, 0.005$\leq$Fe$_2$O$_3$$\leq$0.08, and F+Cl+Br$\leq$0.4; and, in certain embodiments, the glass further includes SnO$_2$ and Fe$_2$O$_3$ and, optionally, Sb$_2$O$_3$, As$_2$O$_3$, fluorine, chlorine, and/or bromine, such that, as calculated in mole percent on an oxide basis, 0.02$\leq$SnO$_2$$\leq$0.3, 0.005$\leq$Fe$_2$O$_3$$\leq$0.08, and F+Cl+Br$\leq$0.4, and such that the glass includes less than 0.05% (e.g., less than 0.04%, less than 0.03%, less than 0.02%, less than 0.01%, etc.) by weight of Sb$_2$O$_3$, As$_2$O$_3$, or combinations thereof.

The use of SnO$_2$, Fe$_2$O$_3$, CeO$_2$, As$_2$O$_3$, Sb$_2$O$_3$, Cl, Br, or combinations thereof as fining can be especially useful in the manufacture of glasses for certain applications, such as substrates for flat panel displays. As mentioned above, fining agents can be added, for example, to produce glasses that are substantially defect-free by facilitating removal of gaseous inclusions from melted batch materials used to produce the glass. Illustratively, iron/tin fining can be used alone or in combination with other fining techniques if desired. For example, iron/tin fining can be combined with halide fining, e.g., bromine fining. However, halide fining presents challenges from a pollution abatement point of view, and halides can complex with iron to produce glass with non-optimal transmission characteristics. Other possible combinations include, but are not limited to, iron/tin fining plus sulfate, sulfide, cerium oxide, mechanical bubbling, and/or vacuum fining. However, optimization may require that the sulfur content of the glass be controlled to avoid the production of gaseous defects containing SO$_2$ or SO$_3$; and the use of excessive amounts of iron or other transition metal fining agents may impart undesirable coloration to the glass.

The glasses of the present invention can further include BaO. In certain embodiments, the glasses of the present invention include less than 1000 ppm by weight of BaO.

As noted above, the glasses of the present invention are "alkali-free". As also noted above, the alkali-free glasses of the present invention can include alkali oxides (e.g., Li$_2$O, Na$_2$O, K$_2$O, etc), provided that the glass (i) is essentially free of intentionally added alkali metal oxide; (ii) contains a total of less than about 0.1 mol % of alkali metal oxides; or (iii) both. For example, in those cases where the glass is to be used as a thin film transistor (TFT) substrate, the intentional inclusion of alkali oxides is generally viewed as being undesirable owing to their negative impact on TFT performance. In certain embodiments, the alkali-free glass of the present invention includes intentionally added alkali oxides, but in amounts such that the alkali-free glass contains less than 1000 ppm (e.g., less than 700 ppm, less than 500 ppm, less than 200 ppm, less than 100 ppm, less than 50 ppm, etc.) by weight of alkali oxides (e.g., in amounts such that the sum of Li$_2$O, Na$_2$O, and K$_2$O is less than 1000 ppm by weight). In certain embodiments, the alkali-free glass of the present invention includes no intentionally added alkali oxides, and the alkali-free glass contains a total of less than about 0.1 mol % of alkali metal oxides.

The glasses of the present invention can further include contaminants as typically found in commercially prepared glass. In addition or alternatively, a variety of other oxides (e.g., TiO$_2$, MnO, ZnO, Nb$_2$O$_5$, MoO$_3$, Ta$_2$O$_5$, WO$_3$, ZrO$_2$, Y$_2$O$_3$, La$_2$O$_3$, and the like) can be added so long as their addition does not push the composition outside of the ranges described above. In those cases where the glasses of the present invention further include such other oxide(s), each of such other oxides are typically present in an amount not exceeding 1 mole percent, and their total combined concentration is typically less than or equal to 5 mole percent, although higher amounts can be used so long as the amounts used do not place the composition outside of the ranges described above. The glasses of the invention can also include various contaminants associated with batch materials and/or introduced into the glass by the melting, fining, and/or forming equipment used to produce the glass (e.g., ZrO$_2$).

As mentioned above, in certain embodiments, the glass satisfies one or more of the following expressions:

$$1.05 \leq (MgO+CaO+SrO)/Al_2O_3 \leq 1.45;$$

$$1.05 \leq (MgO+CaO+SrO)/Al_2O_3 \leq 1.3;$$

$$0.67 \leq (SrO+CaO)/Al_2O_3 \leq 0.92;$$

$$0.72 \leq (SrO+CaO)/Al_2O_3 \leq 0.9;$$

$$0.45 \leq CaO/(CaO+SrO) \leq 0.95;$$

$$0.55 \leq CaO/(CaO+SrO) \leq 0.95; \text{ and}$$

$$0.8 \leq CaO/(CaO+SrO) \leq 0.95.$$

Irrespective of whether the glass satisfies none, one, two, or three, or more of the aforementioned expressions and irrespective of whether the glass contains none, one, or more of additional components (e.g., those discussed above), the SiO$_2$, Al$_2$O$_3$, B$_2$O$_3$, MgO, CaO, SrO, and other components (if any) can be chosen such that, in mole percent on an oxide basis:

$$-0.3 \leq SiO_2 - [SiO_2]_{pred} \leq 0.3 \text{ and}$$

$$-0.3 \leq MgO - [MgO]_{pred} \leq 0.3$$

in which $$[SiO_2]_{pred} = [87.57 - 6.06 \times MgO/B_o + 66.54 \times R_o - 80.61 \times S_o] \times B_o$$

$$[MgO]_{pred} = [1.29 + 12.94 \times R_o - 14.4 \times S_o] \times B_o$$

and in which $$R_o = (MgO+CaO+SrO)/Al_2O_3$$

$$S_o = (CaO+SrO)/Al_2O_3$$

$$B_o = 1 - B_2O_3/100.$$

Additionally or alternatively, the $SiO_2$, $Al_2O_3$, $B_2O_3$, MgO, CaO, SrO, and other components (if any) can be chosen such that: $0.45 \leq CaO/(CaO+SrO) \leq 0.8$; such that $64 \leq SiO_2 \leq 68$; such that $11.3 \leq Al_2O_3 \leq 13.5$; such that $0.02 \leq SnO_2 \leq 0.3$; such that $0.005 \leq Fe_2O_3 \leq 0.08$; such that $F+Cl+Br \leq 0.4$; and/or such the glass includes less than 0.05% (e.g., less than 0.04%, less than 0.03%, less than 0.02%, less than 0.01%, etc.) by weight of $Sb_2O_3$, $As_2O_3$, or combinations thereof.

As mentioned above, the glasses of the present invention include $5\text{-}9B_2O_3$. Examples of such glasses include those in which contain, as calculated in mole percent on an oxide basis: $5\text{-}8.8B_2O_3$, $5\text{-}8.5B_2O_3$, $5\text{-}8.2B_2O_3$, and/or $5\text{-}8B_2O_3$.

Also as mentioned above, the glasses of the present invention include 2-9MgO. Examples of such glasses include those which contain, as calculated in mole percent on an oxide basis: 2-8MgO, 2-7MgO, 2-6MgO, 2.5-9MgO, 2.5-8MgO, 2.5-8MgO, 2.5-7MgO, and/or 2.5-6MgO.

Also as mentioned above, the glasses of the present invention include 1-5SrO. Examples of such glasses include those which contain, as calculated in mole percent on an oxide basis: 1-4.5SrO, 1-4SrO, 1-3.5SrO, 1.5-5SrO, 1.5-4.5SrO, 1.5-4SrO, 1.5-3.5SrO, 2.5-3.5SrO, and/or 2.5-5SrO.

In certain embodiments, the $SiO_2$, $Al_2O_3$, $B_2O_3$, MgO, CaO, SrO, and other components (if any) are chosen such that the glass includes, as calculated in mole percent on an oxide basis: $64\text{-}68.2SiO_2$, $11\text{-}13.5Al_2O_3$, $5\text{-}9B_2O_3$, 2-9 MgO, 3-9CaO, and 1-3.5SrO.

In certain embodiments, the $SiO_2$, $Al_2O_3$, $B_2O_3$, MgO, CaO, SrO, and other components (if any) are chosen such that the glass includes, as calculated in mole percent on an oxide basis: $64\text{-}68.2SiO_2$, $11\text{-}13.5Al_2O_3$, $5\text{-}9B_2O_3$, 2.5-6, MgO, 3-9CaO, and 1-5SrO.

In certain embodiments, the $SiO_2$, $Al_2O_3$, $B_2O_3$, MgO, CaO, SrO, and other components (if any) are chosen such that the glass includes, as calculated in mole percent on an oxide basis: $64\text{-}68.2SiO_2$, $11\text{-}13.5Al_2O_3$, $5\text{-}8B_2O_3$, 2-9, MgO, 3-9CaO, and 1-5SrO.

In certain embodiments, the $SiO_2$, $Al_2O_3$, $B_2O_3$, MgO, CaO, SrO, and other components (if any) are chosen such that the glass includes, as calculated in mole percent on an oxide basis: $64\text{-}68.2SiO_2$, $11\text{-}13.5Al_2O_3$, $5\text{-}8B_2O_3$, 2.5-6, MgO, 3-9CaO, and 1-3.5SrO.

In certain embodiments, the glasses of the present invention have densities of less than about 2.6 g/cm³, such as densities of less than 2.6 g/cm³, densities of less than about 2.56 g/cm³, densities of less than 2.56 g/cm³, densities of from about 2.4 g/cm³ to about 2.6 g/cm³, densities of from 2.4 g/cm³ to 2.6 g/cm³, densities of from about 2.45 g/cm³ to about 2.6 g/cm³, densities of from 2.45 g/cm³ to 2.6 g/cm³, etc.

In certain embodiments, the glasses of the present invention have liquidus temperatures of lower than or equal to about 1200° C., such as liquidus temperatures lower than or equal to about 1190° C., liquidus temperatures lower than or equal to about 1180° C., liquidus temperatures lower than or equal to about 1170° C., liquidus temperatures lower than or equal to about 1160° C., liquidus temperatures lower than or equal to about 1150° C., liquidus temperatures lower than or equal to about 1140° C., liquidus temperatures lower than or equal to about 1130° C., liquidus temperatures lower than or equal to about 1120° C., liquidus temperatures lower than or equal to about 1110° C., and liquidus temperatures lower than or equal to about 1100° C.

As mentioned above, the glasses of the present invention have liquidus viscosities of greater than or equal to about 90,000. Illustratively, in certain embodiments, the glasses of the present invention have liquidus viscosities of greater than or equal to 90,000 poises, such as greater than or equal to about 100,000 poises, greater than or equal to 100,000 poises, greater than or equal to about 110,000 poises, greater than or equal to 110,000 poises, greater than or equal to about 120, 000 poises, greater than or equal to 120,000 poises, greater than or equal to about 130,000 poises, greater than or equal to 130,000 poises, greater than or equal to about 140,000 poises, greater than or equal to 140,000 poises, greater than or equal to about 150,000 poises, greater than or equal to 150,000 poises, greater than or equal to about 160,000 poises, greater than or equal to 160,000 poises, greater than or equal to about 170,000 poises, greater than or equal to 170,000 poises, greater than or equal to about 180,000 poises, greater than or equal to 180,000 poises, etc.

In certain embodiments, the glasses of the present invention have linear coefficients of thermal expansion over the temperature range of 0° C. to 300° C. of less than or equal to about $40 \times 10^{-7}/°C.$, such as less than or equal to $40 \times 10^{-7}/°C.$; less than or equal to about $39 \times 10^{-7}/°C.$; less than or equal to $39 \times 10^{-7}/°C.$; less than or equal to about $38 \times 10^{-7}/°C.$; less than or equal to $38 \times 10^{-7}/°C.$; less than or equal to about $37 \times 10^{-7}/°C.$; less than or equal to $37 \times 10^{-7}/°C.$; less than or equal to about $36 \times 10^{-7}/°C.$; less than or equal to $36 \times 10^{-7}/°C.$; from about $33 \times 10^{-7}/°C.$ to about $40 \times 10^{-7}/°C.$; from $33 \times 10^{-7}/°C.$ to $40 \times 10^{-7}/°C.$; from about $33 \times 10^{-7}/°C.$ to about $36 \times 10^{-7}/°C.$; from $33 \times 10^{-7}/°C.$ to $36 \times 10^{-7}/°C.$; etc.

In certain embodiments, the glasses of the present invention have strain points of greater than or equal to about 680° C., such as greater than or equal to 680° C., greater than or equal to about 685° C., greater than or equal to 685° C., greater than or equal to about 690° C., greater than or equal to 690° C., etc.

In certain embodiments, the glasses of the present invention have anneal points of greater than or equal to about 725° C., such as greater than or equal to 725° C., greater than or equal to about 730° C., greater than or equal to 730° C., greater than or equal to about 735° C., greater than or equal to 735° C., greater than or equal to about 745° C., greater than or equal to 745° C., from about 725° C. to about 760° C., from 725° C. 760° C., from about 735° C. to about 760° C., from 735° C. to 760° C., etc.

In certain embodiments, the glasses of the present invention have melting temperatures of less than or equal to about 1620° C., such as less than or equal to 1620° C., less than or equal to about 1615° C., less than or equal to 1615° C., less than or equal to about 1610° C., less than or equal to 1610° C., etc.

In certain embodiments, the glasses of the present invention have specific moduli of greater than or equal to about 30.5 GPa·cc/g, such as greater than or equal to 30.5 GPa·cc/g, greater than or equal to about 31.5 GPa·cc/g, greater than or equal to 31.5 GPa·cc/g, etc.

The glasses can be produced in a variety of glass shapes, for example, glass plates (e.g., glass plates having a thickness of from about 30 μm to about 2 mm, such as from 30 μm to 2 mm, from about 100 μm to about 1 mm, from 10 μm to 1 mm, etc.).

The sources of the various oxides contained in glasses of the present invention are not particularly critical. Batch ingredients can include fine sand, alumina, boric acid, magnesium oxide, limestone strontium carbonate, strontium nitrate, tin oxide, etc.

For example, $SiO_2$ is typically added as a crushed sand made of alpha quartz, either from loose sand deposits or mined from sandstone or quartzite. While these are commercially available at low cost, other crystalline or amorphous forms of $SiO_2$ can be substituted in part or in whole with little impact on melting behavior. Because molten $SiO_2$ is very viscous and dissolves slowly into alkali-free glass, it is generally advantageous that the sand be crushed so that at least 85% of it passes through a U.S. mesh size of 100, corresponding to mesh opening sizes of about 150 microns. In production, fines may be lofted by batch transfer processes or by air-handling equipment, and, to avoid the health hazards this presents, it may be desirable to remove the smallest fraction of crushed sand as well.

Alumina is typically used as the source of $Al_2O_3$.

Boric acid is typically used as the source of $B_2O_3$.

In addition to the glass formers ($SiO_2$, $Al_2O_3$, and $B_2O_3$), the glasses of the invention also include MgO, CaO, and SrO. As known in the art, the alkaline earths are typically added as oxides (especially MgO), carbonates (CaO and SrO), nitrates (CaO and SrO), and/or hydroxides (MgO, CaO, and SrO). In the case of MgO and CaO, naturally-occurring minerals that can serve as sources include dolomite ($Ca_xMg_{1-x})CO_3$), magnesite ($MgCO_3$), brucite ($Mg(OH)_2$), talc ($Mg_3Si_4O_{10}(OH)_2$), olivine ($Mg_2SiO_4$), and limestone ($CaCO_3$). These natural sources include iron and so can be used as a way of adding this component in those cases where iron oxide is to be present in the glass.

The glasses of the invention can be manufactured using various techniques known in the art. For example, glass plates can be made using a downdraw process, such as by a fusion downdraw process. Compared to other forming processes, such as the float process, the fusion process may be preferred in certain circumstances for several reasons. For example, glass substrates made from the fusion process require less polishing or do not require polishing, depending, of course, on the desired surface roughness of the final product. By way of further illustration, glass substrates made from the fusion process can have reduced average internal stress, relative to glasses made using other processes.

The glasses of the present invention can be used in a variety of applications.

Illustratively, they can be used as a substrate for a silicon semiconductor. For example, the glasses of the present invention can be used to make display glass substrates, such as display glass substrates having thicknesses of from about 30 µm to about 2 mm (e.g., from 30 µm to 2 mm, from about 100 µm to about 1 mm, from 10 µm to 1 mm, etc.). Examples of display glass substrates include TFT display glass substrates, such as a TFT display glass substrates for flat panel display devices.

The present invention also relates to a semiconductor assembly that includes a semiconductor disposed on a glass substrate, wherein said glass substrate comprises an alkali-free glass of the present invention. Examples of semiconductors that can be used in the aforementioned semiconductor assemblies include transistors, diodes, silicon transistors, silicon diodes, and other silicon semiconductors; field effect transistors (FETs), thin-film transistors (TFTs), organic light-emitting diodes (OLEDs) and other light-emitting diodes; as well as semiconductors that are useful in electro-optic (EO) applications, in two photon mixing applications, in non-linear optical (NLO) applications, in electroluminescent applications, and in photovoltaic and sensor applications.

The present invention also relates to a flat panel display device that includes a flat, transparent glass substrate carrying polycrystalline silicon thin film transistors, wherein said glass substrate comprises an alkali-free glass of the present invention. The alkali-free glass includes $SiO_2$, $Al_2O_3$, $B_2O_3$, MgO, CaO, and SrO such that, in mole percent on an oxide basis:

$64 \leq SiO_2 \leq 68.2$;

$11 \leq Al_2O_3 \leq 13.5$;

$5 \leq B_2O_3 \leq 9$;

$2 \leq MgO \leq 9$;

$3 \leq CaO \leq 9$; and $1 \leq SrO \leq 5$.

Examples of suitable glasses from which the glass substrates can be made include those discussed above, for example, glasses which satisfy the following expressions: $1.05 \leq (MgO+CaO+SrO)/Al_2O_3 \leq 1.45$; $0.67 \leq (SrO+CaO)/Al_2O_3 \leq 0.92$; and $0.45 \leq CaO/(CaO+SrO) \leq 0.95$. Typically, in the case of a flat panel display device, the device includes two plates (substrate assemblies) that are manufactured separately. One, the color filter plate, has a series of red, blue, green, and black organic dyes deposited on it. Each of these primary colors corresponds precisely with a sub pixel of the companion active plate. The active plate, so called because it contains the active, thin film transistors (TFTs), is manufactured using typical semiconductor type processes. These include sputtering, CVD, photolithography, and etching.

In certain embodiments, the alkali-free glass used in the aforementioned substrates (e.g., display glass substrates) can be substantially defect-free. As discussed above, alkali-free glasses of the present invention that are substantially defect-free can be produced, for example, by using one or more fining agents, such as $SnO_2$, $Fe_2O_3$, $CeO_2$, $As_2O_3$, $Sb_2O_3$, Cl, Br, or combinations thereof. Examples of suitable combinations are set forth above. Illustratively, the glass can include, as fining agents, $SnO_2$ and $Fe_2O_3$; 0.02-0.3$SnO_2$ and 0.005-0.08$Fe_2O_3$; less than 0.05% by weight of $Sb_2O_3$ and/or $As_2O_3$; $SnO_2$, $Fe_2O_3$, $CeO_2$, Cl, Br, or combinations thereof but less than 0.05% by weight of $Sb_2O_3$ and/or $As_2O_3$; $SnO_2$ and $Fe_2O_3$ but less than 0.05% by weight of $Sb_2O_3$ and/or $As_2O_3$; and/or 0.02-0.3$SnO_2$ and 0.005-0.08$Fe_2O_3$ but less than 0.05% by weight of $Sb_2O_3$ and/or $As_2O_3$.

It is believed that the glasses of the present invention are particularly advantageous in the manufacture of certain substrates for active matrix liquid crystal display devices (AMLCDs). For example, AMLCD substrates optimally meet a variety of customer requirements, several of which are strongly dependent on the fusion process itself. One of these, a pristine surface, is believed to be an attribute of fusion, and partially explains why customers are drawn to substrates made by the fusion process. Another customer requirement is geometric stability under thermal cycling, and in this matter the fusion process sometimes comes up short. Because, in the fusion process, the glass temperature decreases rather quickly from the forming temperatures (e.g., in excess of 1100° C.) to well below the glass transition temperature (e.g., about 720° C. for certain products), the glass has a slightly expanded volume relative to its fully relaxed state, or the state that would be obtained if the glass were held near $T_g$ for a considerable length of time. When the glass is reheated, it naturally relaxes towards its equilibrium volume, and this three-dimensional contraction or relaxation as sometimes referred to as "compaction".

Illustratively, for a given draw (and its own specific cooling profile), and for a particular glass being made into a particular product (e.g., thickness, area, etc.), the rate of cooling can be determined almost entirely by the rate (in inches per minute) at which the sheet comes off the draw. This rate is sometimes referred to as the "pulling roll speed". From draw to draw, it has been found that increasing the pulling roll speed can increase compaction.

If melting takes place at a constant rate (e.g., 900 lbs per hour), then delivering glass onto a longer isopipe slows down the rate at which glass is removed, and hence lowers compaction. Thus, as larger sizes of glass panel substrates are made on a particular tank, a reprieve (of sorts) is obtained for the compaction problem. However, to improve efficiency, it is often desirable to make as many square feet of glass from a given draw as possible. One way to do this is to increase the melt rate, but this can push the system toward the compaction limit. This can be especially true of tanks with smaller isopipes, where high pulling roll rates can result in glasses close to acceptable limits of compaction (e.g., close to the compaction resulting from a 450° C. isothermal hold for one hour).

To pull more glass off of existing assets (i.e., without increasing the size of tanks and isopipes), pulling roll rates can be increased, but this may result in glasses having too high compaction. While it may be possible to revamp the thermal profile of a draw so as to slow the rate of cooling through the critical viscosity region, thus reducing compaction, there are practical limits to how far this can be taken. For example, at some point, the draw must become higher to allow for slower cooling at a high pulling roll speed, and this reinvigorates the problem of getting more glass out of an existing (as opposed to completely redesigned and rebuilt) asset.

Research shows that isothermal holds of glasses produce less compaction as the strain or anneal point of a glass increases. FIG. 1 shows compaction after one hour at 450° C. for glasses with a range of anneal points. Prior to the 450° C. heat treatment, the glasses were subjected to a thermal cycle intended to be similar to the cooling profile of a glass coming off of a fusion draw (e.g., prolonged exposure to high temperature, then rapid cooling at a rate similar to that used in a fusion draw). As can be seen from FIG. 1, as anneal point increases, compaction decreases; however, above an anneal point of about 760° C., the additional gain in compaction performance for a given increase in anneal point diminishes rapidly. The glasses with the highest anneal point in FIG. 1 are intended for low-temperature polysilicon ("pSi") applications.

By way of further illustration, the compositions of the present invention can be optimized so as to have liquidus viscosities of 90 kpoise or greater, melting temperatures of 1620° C. or less, anneal points of 725° C. or greater, and/or specific moduli of 30.5 GPa·cc/g or greater. It is believed that compositions of the present invention having a combination of high modulus and anneal point can especially desirable for use in certain fusion draw processes, such as for fusion draw processes at high cooling rates.

While not intending to be bound or otherwise limited by any theory by which certain glasses of the present invention may operate, it is believed that elevated anneal points may provide enhanced geometric stability during amorphous silicon ("aSi") processing and may permit higher draw speeds without recourse to annealing or expensive equipment redesign. It is also believed (again, without intending to be limited by any theory by which certain glasses of the present invention may operate) that high level of fluxes and comparatively low melting temperatures can accelerate melting and, consequently, may allow for higher melting rates without a corresponding increase in defects.

Compositions of the glasses of the invention can be determined using quantitative analysis techniques well known in the art. Suitable techniques are X-ray fluorescence spectrometry (XRF) for elements with an atomic number higher than 8, inductively coupled plasma optical emission spectrometry (ICP-OES), inductively coupled plasma mass spectrometry (ICP-MS), and electron microprobe analysis. See, for example, J. Nolte, *ICP Emission Spectrometry: A Practical Guide*, Wiley-VCH (2003); H. E. Taylor, *Inductively Coupled Plasma Mass Spectroscopy: Practices and Techniques*, Academic Press (2000); and S. J. B. Reed, *Electron Microprobe Analysis*, Cambridge University Press; 2nd edition (1997), which are hereby incorporated by reference. For an analysis time of about 10 minutes for each element, detection limits of approximately 200 ppm for F and approximately 20 ppm for Cl, Br, Fe, and Sn can be readily achieved using electron microprobe analysis. For trace elements, ICP-MS can be used.

The present invention is further illustrated by the following non-limiting examples.

EXAMPLES

Example 1

This Example 1 and the following Examples 2 and 3 are meant to describe how the present invention was made. These Examples are not meant to, in any way, be limiting; instead, they are provided so that one skilled in the art might have access to applicant's thought process and may use this thought process, if appropriate, to further develop that which is described here to optimize the glasses of the present invention for use in particular applications.

Several surprising insights led to this invention.

First was that the glasses with the best combination of liquidus viscosity, melting temperature, and anneal point tended to have similar proportions of $SiO_2$, $Al_2O_3$, MgO, CaO, and SrO when projected to $B_2O_3$-free compositions. To understand this, it is easiest to consider the example of a single glass, which will also serve to introduce variables required for further discussion, the glass $67SiO_2$–$9B_2O_3$–$11Al_2O_3$–$3MgO$–$7CaO$–$3SrO$. This can be expressed as a $B_2O_3$-free glass as follows:

$$[SiO_2]_o = SiO_2/(1-B_2O_3/100) = 67/(1-9/100) = 73.63$$

$$[Al_2O_3]_o = Al_2O_3/(1-B_2O_3/100) = 11/(1-9/100) = 12.09$$

$$[MgO]_o = MgO/(1-B_2O_3/100) = 3/(1-9/100) = 3.30$$

$$[CaO]_o = CaO/(1-B_2O_3/100) = 7/(1-9/100) = 7.69$$

$$[SrO]_o = SrO/(1-B_2O_3/100) = 3/(1-9/100) = 3.30$$

The liquidus temperature of this glass is believed to be considerably higher than that of the glass that contains $B_2O_3$ because $B_2O_3$ dilutes the concentrations of the other oxides and thus lowers their chemical potentials in the glass. It is further believed that, as $B_2O_3$ is added to this composition, the liquidus temperature will decrease sharply, whereas viscosity will decrease more gradually. It is estimated that, at about 5 mol % $B_2O_3$, the viscosity of the glass at the highest temperature at which crystals form (the liquidus viscosity) will be >85 kpoise, and the glass will be compatible with fusion, perhaps not exactly as generally practiced today, but well within reach of existing or planned adaptations to the process.

What may be most unexpected is that the $B_2O_3$-free analogs of glasses within the ranges of the glasses of the present invention tend to be very similar to one another, and nearly always represent advantageous combinations of high liquidus viscosity, low melting temperature, and high anneal point relative to glasses outside of these ranges. For example, a $B_2O_3$ glass containing no SrO at all would tend to have an unacceptably high liquidus temperature. $B_2O_3$ could be added and eventually a high liquidus viscosity might be obtained, but it would generally have too low an anneal point to facilitate high pull rates. This may be because CaO and MgO (particularly MgO) have unfavorable interactions with $SiO_2$ and stabilize cristobalite (or anorthite) relative to a glass containing SrO in the range $2.5 \leq SrO \leq 5$. To extend this, consider a glass with no MgO but in which $1.05 \leq R_o \leq 1.45$ (i.e., $1.05 \leq (MgO+CaO+SrO)/Al_2O_3 \leq 1.45$). In such a glass, $S_o$ (i.e., $(SrO+CaO)/Al_2O_3$) would be too high (i.e., outside of the range in which $0.67 \leq S_o \leq 0.92$. At fixed $B_2O_3$ concentration, the $SiO_2$ concentration of such a glass could be manipulated so as to increase the liquidus viscosity, perhaps to a very high value, but the melting temperature would be far higher than that of a glass in which $0.67 \leq S_o \leq 0.92$. Moreover, other attributes such as, CTE, density, and/or modulus (which may be of secondary importance, depending on the process by which the glass is to be formed and the use to which the glass is to be put) may also suffer relative to an analogous glass in which $0.67 \leq S_o \leq 0.92$ and $1.05 \leq R_o \leq 1.45$. In other words, it is believed that many $B_2O_3$-free compositions having $S_o$ and/or $R_o$ outside of, but close to, the $0.67 \leq S_o \leq 0.92$ and $1.05 \leq R_o \leq 1.45$ ranges can be made compatible with fusion, but at a cost of anneal points that are perhaps too low and/or melt temperatures that are perhaps too high.

The second surprising insight is that, as $R_o$ increases, the glass with the best combination of liquidus viscosity, melt temperature, and anneal point tends to have a higher MgO content than a glass with the same $B_2O_3$ content but lower $R_o$. Indeed, it is believed that there is a preferred MgO content determined by $R_o$ and $S_o$. This preferred MgO content is referred to as "$[MgO]_{pred}$". Applicant has determined $[MgO]_{pred}$ empirically to be approximated by:

$$[MgO]_{pred} = [1.29 + 12.94 \times R_o - 14.4 \times S_o] \times [1 - B_2O_3/100]$$

For a given $R_o$ and $S_o$, it is believed that, when the difference between MgO and $[MgO]_{pred}$ is small, the glass will have at least two of the following: an advantageous liquidus viscosity, an advantageous melting temperature, an advantageous anneal point. It is further believed that glasses having all three advantageous properties (i.e., an advantageous liquidus viscosity, an advantageous melting temperature, and an advantageous anneal point) can be obtained when $$-0.3 \leq MgO - [MgO]_{pred} \leq 0.3.$$

The third surprising insight is that glasses with the best combinations of liquidus viscosity, melting temperature, and anneal point and $5 \leq B_2O_3 \leq 9$ tend to have $SiO_2$ contents that are determined largely by the MgO content, $R_o$ value, and $S_o$ value of the glass. As is the case with MgO, it is believed that there is a preferred $SiO_2$ content determined by MgO, $R_o$, and $S_o$ (this preferred $SiO_2$ content being referred to as "$[SiO_2]_{pred}$"), but, for fixed $R_o$ and $S_o$, MgO will be determined in part by the level of $B_2O_3$ in the glass. Therefore, it is believed that the preferred value of $SiO_2$ must be calculated using the MgO concentration of the $B_2O_3$-free analog of the composition in question, e.g., from above, $$[MgO]_o = MgO/(1 - B_2O_3/100).$$

With this, applicant has determined $[SiO_2]_{pred}$ to be approximated by:

$$[SiO_2]_{pred} = [87.57 - 6.06 \times MgO/B_o + 66.54 \times R_o - 80.61 \times S_o] \times B_o$$

in which $B_o = 1 - B_2O_3/100$. It is believed that, when the difference between $SiO_2$ and $[SiO_2]_{pred}$ is small, the glass will have at least two of the following: an advantageous liquidus viscosity, an advantageous melting temperature, an advantageous anneal point. It is further believed that glasses having all three advantageous properties (i.e., an advantageous liquidus viscosity, an advantageous melting temperature, and an advantageous anneal point) can be obtained when $$-0.3 \leq SiO_2 - [SiO_2]_{pred} \leq 0.3.$$

To see the interplay between these variables, and to see how to use the relationships set forth in this Example 1 to optimize the glasses of the present invention for particular applications, Examples 2 and 3 are provided below.

Example 2

This Example 2 illustrates a procedure for testing a glass composition to determine whether it is particularly well suited for use in fusion processes. the use of $[MgO]_{pred}$ and $[SiO_2]_{pred}$ to optimize the glasses of the present invention for use in fusion processes.

Consider the glass discussed in Example 1, $67SiO_2$–$9B_2O_3$–$11Al_2O_3$–$3MgO$–$7CaO$–$3SrO$. As a preliminary matter, simple inspection reveals that the glass's oxide components lie within the following ranges:

$$64 \leq SiO_2 \leq 68.2;$$

$$11 \leq Al_2O_3 \leq 13.5;$$

$$5 \leq B_2O_3 \leq 9;$$

$$2 \leq MgO \leq 9;$$

$$3 \leq CaO \leq 9; \text{ and}$$

$$1 \leq SrO \leq 5.$$

Moreover, a simple calculation shows that the expressions $(MgO+CaO+SrO)/Al_2O_3 = (3+7+3)/11 = 1.18$; $(SrO+CaO)/Al_2O_3 = (3+7)/11 = 0.91$; and $CaO/(CaO+SrO) = 7/(7+3) = 0.7$ lie within the following ranges:

$$1.05 \leq (MgO+CaO+SrO)/Al_2O_3 \leq 1.45;$$

$$0.67 \leq (SrO+CaO)/Al_2O_3 \leq 0.92; \text{ and}$$

$$0.45 \leq CaO/(CaO+SrO) \leq 0.95.$$

Using the expressions given above, $R_o$, $S_o$, $C_o$, and $[MgO]_o$ can be calculated as follows:

$$R_o = (MgO+CaO+SrO)/Al_2O_3 = (3+7+3)/11 = 1.18$$

$$S_o = (CaO+SrO)/Al_2O_3 = (7+3)/11 = 0.91$$

$$C_o = CaO/(CaO+SrO) = 7/(7+3) = 0.7$$

$$[MgO]_o = MgO/(1-B_2O_3/100) = 3/(1-9/100) = 3.30$$

The values for $R_o$, $S_o$, $C_o$, and $[MgO]_o$ can then be used to calculate the values of $[MgO]_{pred}$ and $[SiO_2]_{pred}$, as follows:

$$[MgO]_{pred} = [1.29 + 12.94 \times R_o - 14.4 \times S_o] \times [1 - B_2O_3/100] =$$
$$[1.29 + (12.94)(1.18) - (14.4)(0.91)] \times [1 - 9/100] = 3.18$$

$$[SiO]_{pred} = [87.57 - 6.06 \times MgO/B_o + 66.54 \times R_o - 80.61 \times S_o] \times$$
$$B_o = [87.57 - (6.06)(3.3) + (66.54)(1.18) - (80.61)(0.91)] \times$$
$$[1 - 9/100] = 66.94$$

Using these $[MgO]_{pred}$ and $[SiO_2]_{pred}$ values, the expressions $MgO-[MgO]_{pred}$ and for $SiO_2-[SiO_2]_{pred}$ can be determined as follows:

$$MgO-[MgO]_{pred}=3-3.18=-0.18,$$

$$SiO_2-[SiO_2]_{pred}=67-66.94=0.06$$

Thus, the glass composition used in this example (i.e., $SiO_2$–$9B_2O_3$–$11Al_2O_3$–$3MgO$–$7CaO$–$3SrO$) satisfies the expressions:

$$-0.3 \leq MgO-[MgO]_{pred} \leq 0.3$$

$$-0.3 \leq SiO_2-[SiO_2]_{pred} \leq 0.3.$$

It is believed that, for example, relative to glasses with the same $R_o$ and $S_o$ values but with MgO or $SiO_2$ concentrations outside of the preferred ranges (i.e., those concentrations of MgO which differ from $[MgO]_{pred}$ by more than 0.3 and those concentrations of $SiO_2$ which differ from $[SiO_2]_{pred}$ by more than 0.3 and, especially, relative to glasses with MgO or $SiO_2$ concentrations that lie outside of the ranges $64 \leq SiO_2 \leq 68.2$ and $2 \leq MgO \leq 9$, the glass in the example ($67SiO_2$–$9B_2O_3$–$11Al_2O_3$–$3MgO$–$7CaO$–$3SrO$) will tend to have a better combination of liquidus viscosity, melting temperature, and anneal point for use in certain processes (such as in fusion processes).

The process described above in this Example 2 can be repeated for a variety of candidate glass compositions to determine the glass compositions' $[MgO]_{pred}$ and $[SiO_2]_{pred}$ values. It is believed that, by comparing the $[MgO]_{pred}$ and $[SiO_2]_{pred}$ values with the MgO and $SiO_2$ concentrations in the candidate glasses, one can obtain glasses that may have particularly desirable combinations of liquidus viscosity, melting temperature, and anneal point for use in certain processes, such as in fusion processes.

Example 3

This Example 3 illustrates a procedure for generating a glass composition using the relationships described in Example 1.

The procedure involves the following steps:
(1) selecting an anneal point target;
(2) selecting trial values for $R_o$ and $S_o$;
(3) calculating $[MgO]_o$ using $R_o$ and $S_o$;
(4) calculating $[SiO_2]_o$ using $[MgO]_o$ as the target value for MgO;
(5) calculating $[Al_2O_3]_o$, $[CaO]_o$, and $[SrO]_o$ using $R_o$, $S_o$, $[MgO]_o$ and $[SiO_2]_o$;
(6) calculating $B_2O_3$ and using it to calculate the renormalized concentrations of $SiO_2$, $B_2O_3$, $Al_2O_3$, MgO and CaO; and
(7) comparing the result with desired density and CTE targets, and if necessary perform steps 1-6 again with new input parameters.

To perform these steps, we take advantage of three empirical relationships describing the composition dependence of anneal point, coefficient of thermal expansion, and density, viz.:

$$\text{Anneal point}=828.3+3.1Al_2O_3-3.9MgO-4.0CaO-4.4SrO-9.4B_2O_3 (° C.)$$

$$CTE=13.6+0.22B_2O_3+0.75MgO+1.58CaO+1.86SrO (\times 10^{-7}/° C.)$$

$$\text{Density}=2.189+0.0088Al_2O_3-0.0046B_2O_3+0.0100MgO+0.0131CaO+0.0286SrO (g/cm^3)$$

The first step is to select an anneal point target. Anneal points of 740° C. or more afford a substantial increase in pull rate, but anneal points above 760° C. may offer little improvement with regard to aSi applications. If the glass were intended for a larger size sheet, however, it is possible that a lower anneal point might suffice, as melting rate might be the limiting factor. In this example, an intermediate target value of 748° C. was selected.

The next step is to select starting values for $R_o$, $S_o$ and $C_o$. The relationship between these variables and the properties of the final glass are complex, as one may be adjusted against the other to obtain a range of properties. With this in mind, and putting aside for the present the question of liquidus viscosity (and hence compatibility with fusion), it is believed that, generally:

high values of $R_o$ result in low melting temperatures, low anneal points, high CTEs and high densities relative to lower $R_o$ values;

high values of $S_o$ result in high melting temperatures, high CTEs, relatively low anneal points, and high densities relative to lower $S_o$ values;

High values of $C_o$ result in lower melting temperatures, higher CTEs, high anneal points, and high densities.

Given the trends for $C_o$, it might seem attractive to make it as high as possible (1.0), but in fact this tends to drive up liquidus temperatures, and thus diminish liquidus viscosities.

Since the CTEs and densities of glasses of the present invention are almost invariably well-suited for AMLCD applications, it is more usually the case to try to obtain some balance between the competing attributes of liquidus viscosity, melting temperature, and anneal point, then adjust a reference composition so as to improve density or CTE. For this example, the following $R_o$, $S_o$, and $C_o$ values are selected so as to be close to the mid-points of their respective ranges: $R_o=1.23$, $S_o=0.82$, and $C_o=0.65$.

With these $R_o$, $S_o$, and $C_o$ values in hand, steps (3) and (4) are performed. More particularly, a target MgO content for a reference $B_2O_3$-free glass is calculated as follows:

$$[MgO]_o=1.29+12.94 \times R_o-14.4 \times S_o=5.4 \text{ mol }\%.$$

Using $[MgO]_o$ as input, the idealized $SiO_2$ content of the reference $B_2O_3$-free glass is calculated as follows:

$$[SiO_2]_o=87.57-6.06 \times [MgO]_o+66.54 \times R_o-80.61 \times S_o=70.59 \text{ mol }\%.$$

With these values, step (5) can be performed to determine $Al_2O_3$, CaO, and SrO contents for the reference $B_2O_3$-free glass:

$$[Al_2O_3]_o+[CaO]_o+[SrO]_o=100-[SiO_2]_o-[MgO]_o=24 \text{ mol }\%$$

Since $$[CaO+SrO]_o/[Al_2O_3]_o=0.82,$$

combining the previous two expressions yields:

$$1.82[Al_2O_3]_o=24 \text{ mol }\%$$

and, solving for $[Al_2O_3]_o$, one obtains $$[Al_2O_3]_o=13.19 \text{ mol }\%.$$

The combined concentration of CaO and SrO are determined by difference:

$$[CaO+SrO]_o=24-13.19=10.81 \text{ mol }\%.$$

Since by assumption $[CaO]_o/[CaO+SrO]_o=0.65$, the values of $[CaO]_o$ and $[SrO]_o$ are obtained as follows:

$$[CaO]_o=(0.65) \times (10.81)=7.03 \text{ mol }\%$$

$$[SrO]_o=3.78 \text{ mol }\%$$

Using these oxide concentrations (which are pertinent to a $B_2O_3$-free glass), step (6) can be performed. In step (6), the anneal point algorithm presented above is used to determine how much $B_2O_3$ must be added to produce the desired anneal point. Substituting the expressions of the form $[M_xO_y]_o = M_xO_y \times (1-B_2O_3/100)$ into the anneal point expression, where $M_xO_y$ represents $Al_2O_3$, MgO, CaO, and SrO, the following expression is obtained:

Anneal point =
$828.3 + 3.1[Al_2O_3]_o \times (1 - B_2O_3/100) - 3.9[MgO]_o \times (1 - B_2O_3/100) - 4.0[CaO]_o \times (1 - B_2O_3/100) - 4.4[SrO]_o \times (1 - B_2O_3/100) - 9.4B_2O_3$ Defining $K_o = 3.1[Al_2O_3]_o - 3.9[MgO]_o - 4[CaO]_o - 4.4[SrO]_o$ the following expression is obtained:

Anneal point = $828.3 + K_o - B_2O_3 \times K_o/100 - 9.4[B_2O_3]_o$.

With further rearrangement, this expression yields $B_2O_3 = (828.3 - \text{anneal point} + K_o)/(K_o/100 + 9.4)$.

For the composition under consideration, $K_o = (3.1) \times (13.19) - (3.9) \times (5.4) - (4) \times (7.03) - (4.4) \times (3.78) = -24.9$ Substituting this and the target anneal point of 748° C. into the expression for $B_2O_3$, the value for $B_2O_3$ is calculated:

$B_2O_3 = (828.3 - 748 - 24.923)/(-24.9/100 + 9.4) = 6.05$ mol %.

The calculated value for $B_2O_3$ can now be used to renormalize the concentrations of the other oxides. For example, $SiO_2 = [SiO_2]_o \times (1 - 6.05/100) = 66.32$ mol %.

The final composition is $SiO_2 = 66.32$ $Al_2O_3 = 12.39$ $B_2O_3 = 6.05$ $MgO = 5.07$ $CaO = 6.60$ $SrO = 3.55$ Finally, in Step (7), values for CTE and density are calculated to confirm that they are appropriate for the application in mind:

$CTE = 13.6 + 0.22B_2O_3 + 0.75MgO + 1.58CaO + 1.86SrO$ $CTE = 35.8 \times 10^{-7}/°$ C.

and $Density = 2.189 + 0.0088Al_2O_3 - 0.0046B_2O_3 + 0.0100MgO + 0.0131CaO + 0.0286SrO$ $Density = 2.509$ g/cm$^3$.

Both values fall well within the ranges of commercially-available LCD compositions. If lower CTE or density is required, then lower values for $R_o$ and/or a higher $S_o$ may drive the properties in the correct sense, albeit perhaps at the expense of other attributes, such as melting temperature or liquidus viscosity. The best balance depends upon the processes envisioned for manufacturing the glass and limitations on attributes dictated by customer requirements.

It is believed that glasses in which the $SiO_2$, $Al_2O_3$, $B_2O_3$, MgO, CaO, SrO, and other components (if any) are chosen such that the glass includes, as calculated in mole percent on an oxide basis: 64-68.2$SiO_2$, 11-13.5$Al_2O_3$, 5-9$B_2O_3$, 2-9 MgO, 3-9CaO, and 1-5SrO have one or more (e.g., two or more, three or more, etc.) of the following advantageous properties: melting temperature less than or equal to 1620° C. (e.g., less than or equal to 1615° C., less than or equal to 1610° C., etc.); anneal point greater than or equal to 725° C. (e.g., greater than or equal to 730° C., greater than or equal to 735° C., greater than or equal to 740° C., greater than or equal to 745° C., etc.); liquidus viscosities of greater than or equal to 90 kilopoises (e.g., greater than or equal to 100 kilopoises, greater than or equal to 110 kilopoises, greater than or equal to 130 kilopoises, etc.). The data presented in Table 1 below confirm this.

When one migrates outside of the aforementioned ranges (i.e., outside of 64-68.2$SiO_2$, 11-13.5$Al_2O_3$, 5-9$B_2O_3$, 2-9 MgO, 3-9CaO, and 1-5SrO), one might be able to find glasses having one or more of the above-cited advantageous properties, but, in view of the analysis presented in this Example 3, operating outside these ranges will likely impact one or more of the above-cited properties in a particularly unfavorable way. For example, it is believed that having a higher $SiO_2$ content may adversely affect the melting point; having a higher $B_2O_3$ content may adversely affect anneal point; having a lower $B_2O_3$ content and/or a lower $SiO_2$ content may adversely affect liquidus viscosity; etc.

Moreover, as noted above, in certain embodiments, the glass components are selected such that the expression $1.05 \leq (MgO+CaO+SrO)/Al_2O_3 \leq 1.45$ is satisfied. These glasses are believed to possess particularly good anneal points and liquidus viscosities, compared to anneal points when $(MgO+CaO+SrO)/Al_2O_3 > 1.45$ and liquidus viscosities when $(MgO+CaO+SrO)/Al_2O_3 < 1.05$.

Examples 4-103

Table 1 lists examples of glasses of the present invention in terms of mole percents which are either calculated on an oxide basis from the glass batches. Table 1 also lists various physical properties for these glasses, the units for these properties being as follows:

| | |
|---|---|
| Strain Point | ° C. |
| Anneal Point | ° C. |
| Softening Point | ° C. |
| CTE | $\times 10^{-7}/°$ C. (0-300° C.) |
| Density | grams/centimeter$^3$ |
| Melting Temp. | ° C. |
| Liquidus Temp. | ° C. |
| Liquidus Viscosity | kilopoise |

Inasmuch as the sum of the individual constituents totals or very closely approximates 100, for all practical purposes, the reported values may be deemed to represent mole percent. The actual batch ingredients may comprise any materials, either oxides, or other compounds, which, when melted together with the other batch components, will be converted into the desired oxide in the proper proportions. For example, $SrCO_3$ and $CaCO_3$ can provide the source of SrO and CaO, respectively.

The specific batch ingredients used to prepare the glasses of Table 1 were fine sand, alumina, boric acid, magnesium oxide, limestone, and strontium carbonate or strontium nitrate.

The glasses set forth in Table 1 were prepared by melting 3,000 or 19,000 gram batches of each glass composition at a temperature and time to result in a relatively homogeneous glass composition, e.g., at a temperature of about 1600° C. for a period of about 16 hours in platinum crucibles. In particular, the batch materials were ball-milled for one hour using ceramic media in a ceramic mill. The batch was transferred to an 1800 cc platinum crucible and loaded into a furnace at 1600° C. After 16 hours, the crucible was removed from the furnace and the glass was poured onto a cold steel plate. When viscous enough to handle, the glass was transferred to an annealing oven at 725° C., held for one hour at this temperature, then cooled at 0.5° C./minute to room temperature.

The glass properties set forth in Table 1 were determined in accordance with techniques conventional in the glass art. For example, the linear coefficient of thermal expansion (CTE) over the temperature range 0-300° C. is expressed in terms of $\times 10^{-7}/°$ C. and the strain point is expressed in terms of ° C. These were determined from fiber elongation techniques (ASTM references E228-85 and C336, respectively). The density in terms of grams/cm$^3$ was measured via the Archimedes method (ASTM C693). The melting temperature in terms of ° C. (defined as the temperature at which the glass melt demonstrates a viscosity of 200 poises ("T @ 200 p")) was calculated employing a Fulcher equation fit to high temperature viscosity data measured via rotating cylinders viscometry (ASTM C965-81). The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. The liquidus viscosity in kilopoises was determined from the liquidus temperature and the coefficients of the Fulcher equation.

TABLE 1

| | Example | | | | | | | |
|---|---|---|---|---|---|---|---|---|
| | 4 | 5 | 6 | 7 | 8 | 9 | 10 | 11 |
| SiO$_2$ | 64.44 | 66.55 | 66.31 | 67.84 | 66.15 | 67.32 | 67.24 | 67.5 |
| Al$_2$O$_3$ | 11.95 | 12.5 | 12.48 | 12.58 | 12.5 | 12.27 | 12.18 | 12.63 |
| B$_2$O$_3$ | 6.51 | 6.45 | 5.49 | 6 | 6.6 | 5.99 | 7.09 | 6.34 |
| MgO | 6.47 | 4.65 | 5.21 | 3.29 | 5 | 4.23 | 4.31 | 3.69 |
| CaO | 7.4 | 6.6 | 6.16 | 6.69 | 6.1 | 6.52 | 7.85 | 5.29 |
| SrO | 3.23 | 3.25 | 4.23 | 3.6 | 3.65 | 3.51 | 1.22 | 4.55 |
| $R_o$ | 1.43 | 1.16 | 1.25 | 1.08 | 1.18 | 1.16 | 1.10 | 1.07 |
| $S_o$ | 0.89 | 0.79 | 0.83 | 0.82 | 0.78 | 0.82 | 0.74 | 0.78 |
| $C_o$ | 0.70 | 0.67 | 0.59 | 0.65 | 0.63 | 0.65 | 0.87 | 0.54 |
| [SiO$_2$]$_{pred}$ | 64.55 | 66.45 | 66.30 | 67.89 | 66.01 | 67.39 | 67.30 | 67.55 |
| SiO$_2$ − [SiO$_2$]$_{pred}$ | −0.11 | 0.09 | 0.01 | −0.05 | 0.13 | −0.07 | −0.06 | −0.04 |
| [MgO]$_{pred}$ | 6.53 | 4.63 | 5.17 | 3.26 | 4.97 | 4.27 | 4.44 | 3.67 |
| MgO$_2$ − [MgO]$_{pred}$ | −0.06 | 0.02 | 0.04 | 0.03 | 0.03 | −0.04 | −0.13 | 0.02 |
| strain point | 685 | 689 | 706 | 700 | 687 | 701 | 698 | 701 |
| anneal point | 735 | 741 | 751 | 755 | 738 | 754 | 749 | 754 |
| softening point | 959 | 972 | 981 | 991 | 970 | 986 | 982 | 988 |
| CTE | 37.5 | 35 | 36.5 | 36.9 | 35.2 | 34.5 | 33.2 | 35 |
| density | 2.520 | 2.498 | 2.525 | 2.495 | 2.506 | 2.499 | 2.448 | 2.509 |
| melting point | 1535 | 1579 | 1586 | 1604 | 1572 | 1604 | 1593 | 1609 |
| liquidus temperature | 1120 | 1165 | 1170 | 1175 | 1155 | 1165 | 1180 | 1170 |
| liquidus viscosity | 149 | 102 | 109 | 124 | 110 | 152 | 90 | 135 |

| | Example | | | | | | | |
|---|---|---|---|---|---|---|---|---|
| | 12 | 13 | 14 | 15 | 16 | 17 | 18 | 19 |
| SiO$_2$ | 67.41 | 65.24 | 68.39 | 68.09 | 67.78 | 67 | 65.68 | 65.24 |
| Al$_2$O$_3$ | 12.65 | 12.36 | 12.83 | 12.14 | 12.19 | 12.57 | 12.32 | 12.28 |
| B$_2$O$_3$ | 5.84 | 7.58 | 3.99 | 6.35 | 6.2 | 5.42 | 7.68 | 6.99 |
| MgO | 4.07 | 4.77 | 4.47 | 3.11 | 3.58 | 4.73 | 4.97 | 5.12 |
| CaO | 6.26 | 6.31 | 6.44 | 6.67 | 6.6 | 6.42 | 5.97 | 6.07 |
| SrO | 3.6 | 3.74 | 3.71 | 3.51 | 3.52 | 3.69 | 3.38 | 4.18 |
| $R_o$ | 1.10 | 1.20 | 1.14 | 1.09 | 1.12 | 1.18 | 1.16 | 1.25 |
| $S_o$ | 0.78 | 0.81 | 0.79 | 0.84 | 0.83 | 0.80 | 0.76 | 0.83 |
| $C_o$ | 0.63 | 0.63 | 0.63 | 0.66 | 0.65 | 0.64 | 0.64 | 0.59 |
| [SiO$_2$]$_{pred}$ | 67.56 | 65.12 | 68.49 | 68.06 | 67.79 | 67.07 | 65.56 | 65.23 |
| SiO$_2$ − [SiO$_2$]$_{pred}$ | −0.14 | 0.11 | −0.1 | 0.03 | −0.01 | −0.07 | 0.11 | 0.01 |
| [MgO]$_{pred}$ | 4.05 | 4.70 | 4.45 | 3.15 | 3.62 | 4.71 | 4.98 | 5.07 |
| MgO$_2$ − [MgO]$_{pred}$ | 0.02 | 0.07 | 0.02 | −0.04 | −0.04 | 0.02 | −0.01 | 0.05 |
| strain point | 702 | 685 | 725 | 697 | 698 | 704 | 680 | 685 |
| anneal point | 756 | 737 | 777 | 751 | 753 | 758 | 732 | 737 |
| softening point | 995 | 971 | 1009 | 994 | 991 | 988 | 966 | 965 |
| CTE | 34.1 | 35.2 | 35.4 | 33.8 | 34.8 | 35.7 | 34.9 | 39.9 |
| density | 2.501 | 2.496 | 2.521 | 2.487 | 2.492 | 2.512 | 2.481 | 2.514 |
| melting point | 1605 | 1556 | 1617 | 1618 | 1613 | 1596 | 1573 | 1567 |
| liquidus temperature | 1160 | 1140 | 1195 | 1160 | 1165 | 1160 | 1150 | 1150 |
| liquidus viscosity | 199 | 126 | 115 | 194 | 167 | 174 | 111 | 121 |

TABLE 1-continued

| | Example | | | | | | | |
|---|---|---|---|---|---|---|---|---|
| | 20 | 21 | 22 | 23 | 24 | 25 | 26 | 27 |
| $SiO_2$ | 66.84 | 64.13 | 63.94 | 65.17 | 66.38 | 67.6 | 66.42 | 64.7 |
| $Al_2O_3$ | 12.38 | 12.36 | 12.23 | 12.83 | 12.53 | 12.2 | 12.46 | 12.18 |
| $B_2O_3$ | 5.74 | 7.77 | 8.19 | 7.79 | 5.5 | 7.05 | 6.72 | 7.8 |
| MgO | 5.01 | 5.03 | 5.66 | 4.69 | 5.15 | 3.55 | 4.34 | 5.06 |
| CaO | 6.4 | 6.98 | 6.83 | 5.58 | 7.51 | 5.85 | 6.28 | 6.01 |
| SrO | 3.5 | 3.73 | 3.15 | 3.83 | 2.81 | 3.75 | 3.6 | 4.13 |
| $R_o$ | 1.20 | 1.27 | 1.28 | 1.10 | 1.23 | 1.08 | 1.14 | 1.25 |
| $S_o$ | 0.80 | 0.87 | 0.82 | 0.73 | 0.82 | 0.79 | 0.79 | 0.83 |
| $C_o$ | 0.65 | 0.65 | 0.68 | 0.59 | 0.73 | 0.61 | 0.64 | 0.59 |
| $[SiO_2]_{pred}$ | 66.88 | 63.96 | 63.74 | 65.15 | 66.37 | 67.54 | 66.53 | 64.69 |
| $SiO_2 - [SiO_2]_{pred}$ | −0.04 | 0.16 | 0.18 | 0.02 | 0.01 | 0.06 | −0.11 | 0.01 |
| $[MgO]_{pred}$ | 5.04 | 4.87 | 5.58 | 4.56 | 5.10 | 3.62 | 4.32 | 5.02 |
| $MgO_2 - [MgO]_{pred}$ | −0.03 | 0.16 | 0.08 | 0.13 | 0.05 | −0.07 | 0.02 | 0.04 |
| strain point | 699 | 678 | 677 | 698 | 704 | 686 | 694 | 682 |
| anneal point | 752 | 730 | 728 | 742 | 756 | 741 | 747 | 734 |
| softening point | 982 | 958 | 957 | 970 | 984 | 981 | 979 | 964 |
| CTE | 35.1 | 36.9 | 36 | 34.6 | 36.2 | 33.7 | 34.5 | 36.1 |
| density | 2.508 | 2.509 | 2.492 | 2.495 | 2.505 | 2.485 | 2.491 | 2.506 |
| melting point | 1589 | 1535 | 1540 | 1573 | 1587 | 1607 | 1588 | 1566 |
| liquidus temperature | 1180 | 1100 | 1130 | 1155 | 1175 | 1150 | 1140 | 1120 |
| liquidus viscosity | 91 | 254 | 105 | 125 | 96 | 198 | 228 | 234 |

| | Example | | | | | | | |
|---|---|---|---|---|---|---|---|---|
| | 28 | 29 | 30 | 31 | 32 | 33 | 34 | 35 |
| $SiO_2$ | 67.66 | 66.85 | 66.1 | 67.64 | 66.89 | 66.33 | 66.01 | 66.83 |
| $Al_2O_3$ | 12.7 | 12.28 | 12.2 | 12.46 | 12.67 | 12.48 | 12.32 | 12.76 |
| $B_2O_3$ | 5 | 5.41 | 6.2 | 6.33 | 5.48 | 5.49 | 5.49 | 5.5 |
| MgO | 4.42 | 5.12 | 5.7 | 3.88 | 5.52 | 5.79 | 5.35 | 4.93 |
| CaO | 6.38 | 6.06 | 6.05 | 5.13 | 5.51 | 6.3 | 6.95 | 8.12 |
| SrO | 3.67 | 4.17 | 3.75 | 4.56 | 3.79 | 3.49 | 3.74 | 1.74 |
| $R_o$ | 1.14 | 1.25 | 1.27 | 1.09 | 1.17 | 1.25 | 1.30 | 1.16 |
| $S_o$ | 0.79 | 0.83 | 0.80 | 0.78 | 0.73 | 0.78 | 0.87 | 0.77 |
| $C_o$ | 0.63 | 0.59 | 0.62 | 0.53 | 0.59 | 0.64 | 0.65 | 0.82 |
| $[SiO_2]_{pred}$ | 67.76 | 66.89 | 66.06 | 67.61 | 66.84 | 66.32 | 66.05 | 66.81 |
| $SiO_2 - [SiO_2]_{pred}$ | −0.1 | −0.04 | 0.04 | 0.02 | 0.04 | 0.01 | −0.04 | 0.02 |
| $[MgO]_{pred}$ | 4.40 | 5.16 | 5.78 | 3.91 | 5.54 | 5.81 | 5.32 | 4.87 |
| $MgO_2 - [MgO]_{pred}$ | 0.02 | −0.04 | −0.08 | −0.03 | −0.02 | −0.02 | 0.03 | 0.06 |
| strain point | 714 | 712 | 687 | 697 | 705 | 710 | 693 | 705 |
| anneal point | 766 | 756 | 739 | 750 | 757 | 754 | 746 | 758 |
| softening point | 1001 | 983 | 966 | 982 | 985 | 983 | 973 | 988 |
| CTE | 35.2 | 36.2 | 34.9 | 34.6 | 34 | 35.9 | 37.2 | 34.7 |
| density | 2.514 | 2.522 | 2.515 | 2.508 | 2.513 | 2.513 | 2.525 | 2.471 |
| melting point | 1602 | 1594 | 1580 | n.d. | 1597 | 1582 | 1579 | 1593 |
| liquidus temperature | 1180 | 1175 | 1160 | 1160 | 1175 | 1165 | 1150 | 1180 |
| liquidus viscosity | 118 | 99 | 102 | n.d. | 108 | 114 | 144 | 92 |

| | Example | | | | | | | |
|---|---|---|---|---|---|---|---|---|
| | 36 | 37 | 38 | 39 | 40 | 41 | 42 | 43 |
| $SiO_2$ | 66.58 | 66.79 | 66.8 | 67.01 | 66.56 | 66.8 | 67.24 | 64.84 |
| $Al_2O_3$ | 12.48 | 12.25 | 12.5 | 12.58 | 12.37 | 12.5 | 12.18 | 12.38 |
| $B_2O_3$ | 6.5 | 5.49 | 5.4 | 5.5 | 5.48 | 5.4 | 7.09 | 7.79 |
| MgO | 4.36 | 5.12 | 5.73 | 4.61 | 5.15 | 4.59 | 3.32 | 4.96 |
| CaO | 6.29 | 7.22 | 4.97 | 7.21 | 7.29 | 6.12 | 8.84 | 4.94 |
| SrO | 3.61 | 2.99 | 4.59 | 2.96 | 3.01 | 4.59 | 1.22 | 4.95 |
| $R_o$ | 1.14 | 1.25 | 1.22 | 1.17 | 1.25 | 1.22 | 1.10 | 1.20 |
| $S_o$ | 0.79 | 0.83 | 0.76 | 0.81 | 0.83 | 0.86 | 0.83 | 0.80 |
| $C_o$ | 0.64 | 0.71 | 0.52 | 0.71 | 0.71 | 0.57 | 0.88 | 0.50 |
| $[SiO_2]_{pred}$ | 66.69 | 66.87 | 66.68 | 67.05 | 66.60 | 66.69 | 67.27 | 64.83 |
| $SiO_2 - [SiO_2]_{pred}$ | −0.1 | −0.07 | 0.11 | −0.03 | −0.04 | 0.1 | −0.03 | 0.01 |
| $[MgO]_{pred}$ | 4.34 | 5.17 | 5.77 | 4.57 | 5.15 | 4.52 | 3.34 | 4.89 |
| $MgO_2 - [MgO]_{pred}$ | 0.02 | −0.05 | −0.04 | 0.04 | 0 | 0.07 | −0.02 | 0.07 |
| strain point | 702 | 700 | 702 | 705 | 700 | 694 | 697 | 679 |
| anneal point | 754 | 753 | 755 | 757 | 753 | 746 | 751 | 731 |
| softening point | 984 | 982 | 994 | 987 | 983 | 977 | 987 | 964 |
| CTE | 34.9 | 35.5 | 34.4 | 35.4 | 36 | 37.1 | 33.9 | 35.8 |
| density | 2.502 | 2.505 | 2.526 | 2.503 | 2.510 | 2.538 | 2.448 | 2.518 |
| melting point | 1593 | 1592 | n.d. | 1601 | 1589 | n.d. | 1595 | 1558 |
| liquidus temperature | 1155 | 1175 | 1185 | 1185 | 1165 | 1160 | 1180 | 1160 |
| liquidus viscosity | 174 | 101 | n.d. | 89 | 123 | n.d. | 94 | 87 |

TABLE 1-continued

| | Example | | | | | | | |
|---|---|---|---|---|---|---|---|---|
| | 44 | 45 | 46 | 47 | 48 | 49 | 50 | 51 |
| $SiO_2$ | 67.66 | 68.03 | 67.21 | 66.3 | 67.32 | 67.5 | 65.04 | 67.73 |
| $Al_2O_3$ | 12.08 | 12.77 | 12.61 | 12.47 | 12.27 | 12.18 | 12.48 | 12.56 |
| $B_2O_3$ | 7.13 | 4.5 | 5.64 | 5.49 | 5.99 | 7.03 | 6.89 | 5.99 |
| MgO | 3.42 | 4.44 | 4.39 | 5.7 | 4.23 | 3.54 | 5.13 | 3.29 |
| CaO | 6.47 | 6.4 | 6.34 | 7.02 | 6.52 | 5.84 | 6.89 | 6.67 |
| SrO | 3.24 | 3.69 | 3.64 | 2.89 | 3.51 | 3.74 | 3.57 | 3.59 |
| $R_o$ | 1.09 | 1.14 | 1.14 | 1.25 | 1.16 | 1.08 | 1.25 | 1.08 |
| $S_o$ | 0.80 | 0.79 | 0.79 | 0.79 | 0.82 | 0.79 | 0.84 | 0.82 |
| $C_o$ | 0.67 | 0.63 | 0.64 | 0.71 | 0.65 | 0.61 | 0.66 | 0.65 |
| $[SiO_2]_{pred}$ | 67.55 | 68.13 | 67.31 | 66.30 | 67.39 | 67.60 | 64.87 | 67.94 |
| $SiO_2 - [SiO_2]_{pred}$ | 0.1 | −0.1 | −0.1 | 0 | −0.07 | −0.1 | 0.16 | −0.2 |
| $[MgO]_{pred}$ | 3.50 | 4.42 | 4.37 | 5.71 | 4.27 | 3.62 | 5.00 | 3.26 |
| $MgO_2 - [MgO]_{pred}$ | −0.08 | 0.02 | 0.02 | −0.01 | −0.04 | −0.08 | 0.13 | 0.03 |
| strain point | 686 | 720 | 706 | 701 | 701 | 700 | 689 | 696 |
| anneal point | 741 | 771 | 759 | 753 | 754 | 753 | 741 | 749 |
| softening point | 983 | 1006 | 988 | 979 | 986 | 986 | 964 | 987 |
| CTE | 36 | 34.7 | 34.7 | 32.4 | 34.5 | 34.6 | 36.5 | 34.2 |
| density | 2.474 | 2.517 | 2.506 | 2.504 | 2.499 | 2.501 | 2.511 | 2.487 |
| melting point | 1602 | 1613 | 1599 | 1585 | 1600 | 1608 | 1556 | n.d. |
| liquidus temperature | 1150 | 1185 | 1170 | 1170 | 1165 | 1170 | 1120 | 1150 |
| liquidus viscosity | 185 | 122 | 151 | 99 | 149 | 131 | 191 | n.d. |

| | Example | | | | | | | |
|---|---|---|---|---|---|---|---|---|
| | 52 | 53 | 54 | 55 | 56 | 57 | 58 | 59 |
| $SiO_2$ | 67.56 | 66.84 | 67.95 | 66.7 | 66.59 | 66.06 | 66.24 | 66.6 |
| $Al_2O_3$ | 12.06 | 12.33 | 11.95 | 12.5 | 12.63 | 12.52 | 12.41 | 12.57 |
| $B_2O_3$ | 7.12 | 6.98 | 6.7 | 6.15 | 5.5 | 6 | 6.51 | 5.5 |
| MgO | 3.41 | 3.99 | 3.4 | 4.7 | 5.04 | 5.17 | 4.67 | 5.56 |
| CaO | 6.46 | 5.69 | 6.15 | 6.05 | 7.77 | 6.66 | 6.35 | 6.83 |
| SrO | 3.24 | 3.99 | 3.85 | 3.9 | 2.34 | 3.59 | 3.64 | 2.81 |
| $R_o$ | 1.09 | 1.11 | 1.12 | 1.17 | 1.20 | 1.23 | 1.18 | 1.21 |
| $S_o$ | 0.80 | 0.79 | 0.84 | 0.80 | 0.80 | 0.82 | 0.80 | 0.77 |
| $C_o$ | 0.67 | 0.59 | 0.62 | 0.61 | 0.77 | 0.65 | 0.64 | 0.71 |
| $[SiO_2]_{pred}$ | 67.59 | 66.97 | 67.75 | 66.60 | 66.58 | 65.91 | 66.32 | 66.57 |
| $SiO_2 - [SiO_2]_{pred}$ | −0.03 | −0.12 | 0.19 | 0.09 | 0.01 | 0.14 | −0.08 | 0.03 |
| $[MgO]_{pred}$ | 3.49 | 4.02 | 3.48 | 4.68 | 4.99 | 5.10 | 4.65 | 5.57 |
| $MgO_2 - [MgO]_{pred}$ | −0.08 | −0.03 | −0.08 | 0.02 | 0.05 | 0.07 | 0.02 | −0.01 |
| strain point | 696 | 696 | 687 | 689 | 703 | 692 | 694 | 703 |
| anneal point | 750 | 749 | 741 | 742 | 755 | 745 | 746 | 755 |
| softening point | 989 | 986 | 981 | 978 | 986 | 977 | 981 | 983 |
| CTE | 34 | 33.8 | 35.7 | 34.6 | 36.2 | 35.9 | 35.1 | 34.8 |
| density | 2.479 | 2.488 | 2.489 | 2.506 | 2.495 | 2.514 | 2.503 | 2.501 |
| melting point | 1607 | 1601 | 1600 | 1589 | 1587 | 1570 | 1587 | 1590 |
| liquidus temperature | 1160 | 1150 | 1150 | 1150 | 1175 | 1140 | 1145 | 1170 |
| liquidus viscosity | 188 | 216 | 188 | 156 | 93 | 172 | 177 | 100 |

| | Example | | | | | | | |
|---|---|---|---|---|---|---|---|---|
| | 60 | 61 | 62 | 63 | 64 | 65 | 66 | 67 |
| $SiO_2$ | 66.48 | 66.99 | 66.01 | 67.68 | 65.22 | 67.45 | 66.62 | 66.85 |
| $Al_2O_3$ | 12.81 | 11.71 | 13.07 | 11.86 | 11.42 | 12.05 | 12.42 | 12.31 |
| $B_2O_3$ | 6 | 6.92 | 6 | 7.62 | 8.41 | 6.65 | 5.5 | 5.5 |
| MgO | 4.23 | 5.06 | 4.23 | 3.44 | 4.5 | 3.75 | 5.1 | 5.06 |
| CaO | 6.81 | 4.51 | 6.95 | 6.3 | 6.33 | 6.2 | 7.44 | 7.38 |
| SrO | 3.67 | 4.81 | 3.74 | 3.1 | 4 | 3.9 | 2.78 | 2.76 |
| $R_o$ | 1.15 | 1.23 | 1.14 | 1.08 | 1.30 | 1.15 | 1.23 | 1.23 |
| $S_o$ | 0.82 | 0.80 | 0.82 | 0.79 | 0.90 | 0.84 | 0.82 | 0.82 |
| $C_o$ | 0.65 | 0.48 | 0.65 | 0.67 | 0.61 | 0.61 | 0.73 | 0.73 |
| $[SiO_2]_{pred}$ | 66.47 | 67.10 | 66.06 | 67.53 | 65.26 | 67.31 | 66.65 | 66.91 |
| $SiO_2 - [SiO_2]_{pred}$ | 0.01 | −0.1 | −0.05 | 0.14 | −0.04 | 0.13 | −0.03 | −0.06 |
| $[MgO]_{pred}$ | 4.09 | 5.32 | 4.01 | 3.58 | 4.63 | 3.81 | 5.10 | 5.10 |
| $MgO_2 - [MgO]_{pred}$ | 0.14 | −0.26 | 0.22 | −0.14 | −0.13 | −0.06 | 0 | −0.04 |
| strain point | 698 | 682 | 699 | 683 | 676 | 687 | 704 | 704 |
| anneal point | 751 | 735 | 752 | 736 | 725 | 740 | 755 | 755 |
| softening point | 987 | 974 | 985 | 984 | 957 | 980 | 985 | 986 |
| CTE | 36.1 | 35.9 | 38.1 | 33.5 | 36.3 | 34.8 | 35.7 | 36.1 |
| density | 2.511 | 2.505 | 2.514 | 2.471 | 2.494 | 2.496 | 2.502 | 2.501 |
| melting point | 1583 | 1586 | 1578 | n.d. | 1557 | 1598 | 1592 | 1596 |
| liquidus temperature | 1165 | 1150 | 1170 | 1150 | 1120 | 1145 | 1180 | 1180 |
| liquidus viscosity | 116 | 136 | 103 | n.d. | 172 | 189 | 88 | 92 |

TABLE 1-continued

| | Example | | | | | | | |
|---|---|---|---|---|---|---|---|---|
| | 68 | 69 | 70 | 71 | 72 | 73 | 74 | 75 |
| $SiO_2$ | 64.98 | 65.94 | 67.55 | 66.83 | 67.57 | 67.4 | 65.15 | 67.54 |
| $Al_2O_3$ | 12.59 | 12.42 | 12.73 | 12.99 | 12 | 12.25 | 12.34 | 11.78 |
| $B_2O_3$ | 7.8 | 5.99 | 6.05 | 5.55 | 7.62 | 6.75 | 7.56 | 8.2 |
| MgO | 4.83 | 5.18 | 3.74 | 4.24 | 3.28 | 3.5 | 4.77 | 3.02 |
| CaO | 4.84 | 6.12 | 6.2 | 7.44 | 6.43 | 5.75 | 6.29 | 7.01 |
| SrO | 4.83 | 4.22 | 3.56 | 2.95 | 3.1 | 4.35 | 3.73 | 2.45 |
| $R_o$ | 1.15 | 1.25 | 1.06 | 1.13 | 1.07 | 1.11 | 1.20 | 1.06 |
| $S_o$ | 0.77 | 0.83 | 0.77 | 0.80 | 0.79 | 0.82 | 0.81 | 0.80 |
| $C_o$ | 0.50 | 0.59 | 0.64 | 0.72 | 0.67 | 0.57 | 0.63 | 0.74 |
| $[SiO_2]_{pred}$ | 64.96 | 65.94 | 67.78 | 66.84 | 67.46 | 67.33 | 65.19 | 67.34 |
| $SiO_2 - [SiO_2]_{pred}$ | 0.02 | 0 | −0.22 | −0.01 | 0.1 | 0.07 | −0.04 | 0.18 |
| $[MgO]_{pred}$ | 4.73 | 5.13 | 3.72 | 4.09 | 3.38 | 3.51 | 4.71 | 3.14 |
| $MgO_2 - [MgO]_{pred}$ | 0.1 | 0.05 | 0.02 | 0.15 | −0.1 | −0.01 | 0.06 | −0.12 |
| strain point | 685 | 702 | 701 | 706 | 687 | 687 | 688 | 679 |
| anneal point | 735 | 747 | 754 | 759 | 742 | 740 | 739 | 733 |
| softening point | 964 | 975 | 990 | 993 | 987 | 979 | 971 | 967 |
| CTE | 39.9 | 36 | 34.4 | 35.1 | 33.2 | 35 | 35.1 | 33.3 |
| density | 2.541 | 2.523 | 2.497 | 2.503 | 2.462 | 2.502 | 2.497 | 2.448 |
| melting point | 1564 | 1595 | 1595 | 1589 | n.d. | 1609 | 1583 | n.d. |
| liquidus temperature | 1125 | 1170 | 1140 | 1165 | 1145 | 1150 | 1150 | 1135 |
| liquidus viscosity | 219 | 116 | 269 | 137 | n.d. | 184 | 142 | n.d. |

| | Example | | | | | | | |
|---|---|---|---|---|---|---|---|---|
| | 76 | 77 | 78 | 79 | 80 | 81 | 82 | 83 |
| $SiO_2$ | 67.16 | 66.94 | 65.59 | 66.58 | 64.68 | 65.37 | 66.32 | 64.23 |
| $Al_2O_3$ | 12.8 | 12.56 | 12.34 | 12.58 | 12.18 | 12.03 | 12.48 | 11.91 |
| $B_2O_3$ | 5.87 | 5.99 | 6.49 | 5.48 | 7.79 | 5.49 | 5.49 | 8.38 |
| MgO | 3.8 | 4.39 | 5.15 | 5.68 | 6.02 | 6.09 | 5.81 | 5.2 |
| CaO | 6.56 | 6.31 | 6.1 | 5.65 | 4.61 | 7.09 | 5.79 | 7.03 |
| SrO | 3.81 | 3.63 | 4.2 | 3.89 | 4.61 | 3.82 | 4 | 3.25 |
| $R_o$ | 1.11 | 1.14 | 1.25 | 1.21 | 1.25 | 1.41 | 1.25 | 1.30 |
| $S_o$ | 0.81 | 0.79 | 0.83 | 0.76 | 0.76 | 0.91 | 0.78 | 0.86 |
| $C_o$ | 0.63 | 0.63 | 0.59 | 0.59 | 0.50 | 0.65 | 0.59 | 0.68 |
| $[SiO_2]_{pred}$ | 67.22 | 67.05 | 65.59 | 66.55 | 64.65 | 65.56 | 66.29 | 64.15 |
| $SiO_2 - [SiO_2]_{pred}$ | −0.06 | −0.1 | 0 | 0.03 | 0.03 | −0.18 | 0.02 | 0.08 |
| $[MgO]_{pred}$ | 3.70 | 4.37 | 5.11 | 5.69 | 6.07 | 6.15 | 5.83 | 5.19 |
| $MgO_2 - [MgO]_{pred}$ | 0.1 | 0.02 | 0.04 | −0.01 | −0.05 | −0.06 | −0.02 | 0.01 |
| strain point | 705 | 704 | 688 | 706 | 683 | 690 | 708 | 677 |
| anneal point | 759 | 756 | 740 | 757 | 731 | 741 | 753 | 727 |
| softening point | 992 | 987 | 969 | 987 | 960 | 966 | 981 | 954 |
| CTE | 35.9 | 35.1 | 37.7 | 35.7 | 35.9 | 37.3 | 35.7 | 35.8 |
| density | 2.506 | 2.505 | 2.518 | 2.513 | 2.513 | 2.532 | 2.521 | 2.492 |
| melting point | 1599 | 1588 | 1576 | 1599 | 1557 | 1566 | 1588 | 1549 |
| liquidus temperature | 1160 | 1165 | 1155 | 1170 | 1120 | 1150 | 1170 | 1130 |
| liquidus viscosity | 170 | 129 | 117 | 114 | 203 | 116 | 110 | 100 |

| | Example | | | | | | | |
|---|---|---|---|---|---|---|---|---|
| | 84 | 85 | 86 | 87 | 88 | 89 | 90 | 91 |
| $SiO_2$ | 66.77 | 67.24 | 67.76 | 64.4 | 64.7 | 67.15 | 67.42 | 67.09 |
| $Al_2O_3$ | 12.58 | 12.18 | 11.52 | 11.6 | 12.18 | 12.5 | 12.29 | 12.26 |
| $B_2O_3$ | 7.12 | 7.09 | 8.19 | 7.8 | 7.8 | 7.05 | 6 | 5.84 |
| MgO | 3.71 | 4.31 | 3.33 | 5.4 | 5.06 | 3.35 | 4.23 | 4.21 |
| CaO | 6.13 | 7.85 | 6.75 | 6.4 | 6.01 | 5.7 | 6.54 | 7.03 |
| SrO | 3.52 | 1.22 | 2.45 | 4.4 | 4.13 | 4.25 | 3.52 | 3.57 |
| $R_o$ | 1.06 | 1.10 | 1.09 | 1.40 | 1.25 | 1.06 | 1.16 | 1.21 |
| $S_o$ | 0.77 | 0.74 | 0.80 | 0.93 | 0.83 | 0.80 | 0.82 | 0.86 |
| $C_o$ | 0.64 | 0.87 | 0.73 | 0.59 | 0.59 | 0.57 | 0.65 | 0.66 |
| $[SiO_2]_{pred}$ | 67.00 | 67.30 | 67.52 | 64.45 | 64.69 | 67.22 | 67.33 | 66.97 |
| $SiO_2 - [SiO_2]_{pred}$ | −0.21 | −0.06 | 0.22 | −0.05 | 0.01 | −0.07 | 0.08 | 0.11 |
| $[MgO]_{pred}$ | 3.69 | 4.44 | 3.54 | 5.47 | 5.02 | 3.33 | 4.26 | 4.19 |
| $MgO_2 - [MgO]_{pred}$ | 0.02 | −0.13 | −0.21 | −0.07 | 0.04 | 0.02 | −0.03 | 0.02 |
| strain point | 697 | 694 | 703 | 677 | 685 | 689 | 697 | 698 |
| anneal point | 751 | 748 | 757 | 727 | 732 | 742 | 751 | 751 |
| softening point | 985 | 983 | 994 | 950 | 959 | 982 | 992 | 985 |
| CTE | 34.4 | 33 | 34.2 | 38.4 | 36 | 34.6 | 36.2 | 36.3 |
| density | 2.493 | 2.445 | 2.492 | 2.518 | 2.509 | 2.496 | 2.496 | 2.509 |
| melting point | 1597 | 1601 | 1607 | 1549 | 1566 | 1597 | 1602 | 1587 |
| liquidus temperature | 1160 | 1175 | 1150 | 1100 | 1120 | 1150 | 1175 | 1170 |
| liquidus viscosity | 171 | 96 | 193 | 264 | 226 | 190 | 119 | 99 |

TABLE 1-continued

| | Example | | | | | | | |
|---|---|---|---|---|---|---|---|---|
| | 92 | 93 | 94 | 95 | 96 | 97 | 98 | 99 |
| $SiO_2$ | 64.32 | 66.95 | 66.31 | 66.89 | 66 | 66.87 | 66.62 | 66.8 |
| $Al_2O_3$ | 11.59 | 12.35 | 12.47 | 12.67 | 11.92 | 12.5 | 12.51 | 12.6 |
| $B_2O_3$ | 7.8 | 7 | 5.5 | 5.49 | 6.26 | 5.5 | 6.92 | 6.7 |
| MgO | 5.4 | 4 | 7 | 5.41 | 5.01 | 4.34 | 4.02 | 4.15 |
| CaO | 6.38 | 5.7 | 5.59 | 6.66 | 6.92 | 6.93 | 6.2 | 6.45 |
| SrO | 4.39 | 4 | 3.01 | 2.74 | 3.89 | 3.74 | 3.56 | 3.3 |
| $R_o$ | 1.40 | 1.11 | 1.25 | 1.17 | 1.33 | 1.20 | 1.10 | 1.10 |
| $S_o$ | 0.93 | 0.79 | 0.69 | 0.74 | 0.91 | 0.85 | 0.78 | 0.77 |
| $C_o$ | 0.59 | 0.59 | 0.65 | 0.71 | 0.64 | 0.65 | 0.64 | 0.66 |
| $[SiO_2]_{pred}$ | 64.50 | 66.91 | 66.29 | 66.86 | 65.94 | 66.89 | 66.77 | 66.78 |
| $SiO_2 - [SiO_2]_{pred}$ | −0.16 | 0.04 | 0.02 | 0.03 | 0.06 | −0.02 | −0.14 | 0.02 |
| $[MgO]_{pred}$ | 5.48 | 4.02 | 7.14 | 5.42 | 5.05 | 4.27 | 4.00 | 4.12 |
| $MgO_2 - [MgO]_{pred}$ | −0.08 | −0.02 | −0.14 | −0.01 | −0.04 | 0.07 | 0.02 | 0.03 |
| strain point | 675 | 685 | 711 | 706 | 689 | 699 | 694 | 689 |
| anneal point | 725 | 738 | 756 | 758 | 741 | 752 | 748 | 742 |
| softening point | 951 | 980 | 978 | 988 | 969 | 984 | 979 | 977 |
| CTE | 37.1 | 35.2 | 34.6 | 34.3 | 37.6 | 36.4 | 34.2 | 34.7 |
| density | 2.516 | 2.495 | 2.505 | 2.498 | 2.519 | 2.513 | 2.491 | 2.491 |
| melting point | 1551 | 1592 | 1581 | 1591 | 1565 | 1595 | 1592 | 1594 |
| liquidus temperature | 1120 | 1150 | 1170 | 1170 | 1160 | 1165 | 1145 | 1140 |
| liquidus viscosity | 159 | 159 | 104 | 116 | 87 | 132 | 217 | 223 |

| | Example | | | |
|---|---|---|---|---|
| | 100 | 101 | 102 | 103 |
| $SiO_2$ | 67.3 | 65.72 | 66.59 | 65.14 |
| $Al_2O_3$ | 12.63 | 12.44 | 12.38 | 12.83 |
| $B_2O_3$ | 5.5 | 6.74 | 5.45 | 7.79 |
| MgO | 4.41 | 5.02 | 5.16 | 4.71 |
| CaO | 6.35 | 6.4 | 6.11 | 4.7 |
| SrO | 3.65 | 3.68 | 4.2 | 4.71 |
| $R_o$ | 1.14 | 1.21 | 1.25 | 1.10 |
| $S_o$ | 0.79 | 0.81 | 0.83 | 0.73 |
| $C_o$ | 0.64 | 0.63 | 0.59 | 0.50 |
| $[SiO_2]_{pred}$ | 67.39 | 65.58 | 66.60 | 65.12 |
| $SiO_2 - [SiO_2]_{pred}$ | −0.09 | 0.13 | −0.01 | 0.02 |
| $[MgO]_{pred}$ | 4.39 | 4.96 | 5.16 | 4.58 |
| $MgO_2 - [MgO]_{pred}$ | 0.02 | 0.06 | 0 | 0.13 |
| strain point | 710 | 685 | 707 | 694 |
| anneal point | 762 | 737 | 753 | 740 |
| softening point | 992 | 968 | 983 | 970 |
| CTE | 34.9 | 35.8 | 35.3 | 35.2 |
| density | 2.507 | 2.503 | 2.520 | 2.512 |
| melting point | 1599 | 1565 | 1600 | 1573 |
| liquidus temperature | 1170 | 1160 | 1180 | 1150 |
| liquidus viscosity | 136 | 90 | 88 | 117 |

From Table 1, it can be seen that the compositions that satisfy the expressions:

$$-0.3 \le MgO - [MgO]_{pred} \le 0.3$$

$$-0.3 \le SiO_2 - [SiO_2]_{pred} \le 0.3$$

have liquidus viscosities of at least 90 kpoise, and are therefore are compatible with fusion as practiced today, or can be made compatible with fusion with minimal adjustment to current processes. For comparison, the nominal liquidus viscosity of Corning's Eagle XG is 130 kpoise, and devitrification within the quality area has never been seen for this glass in production. This is because of its comparatively steep viscosity curve, which permits a smaller ΔT across the isopipe. Since some glasses set forth in Table 1 have melting temperatures comparable to or lower than Eagle XG and anneal points higher than Eagle XG, they have still steeper viscosity curves, and so a slightly lower liquidus viscosity is believed to be acceptable. Of course, many of the glasses have liquidus viscosities comparable to or greater than Eagle XG, and, for these, the risk is much smaller.

Figure 2:
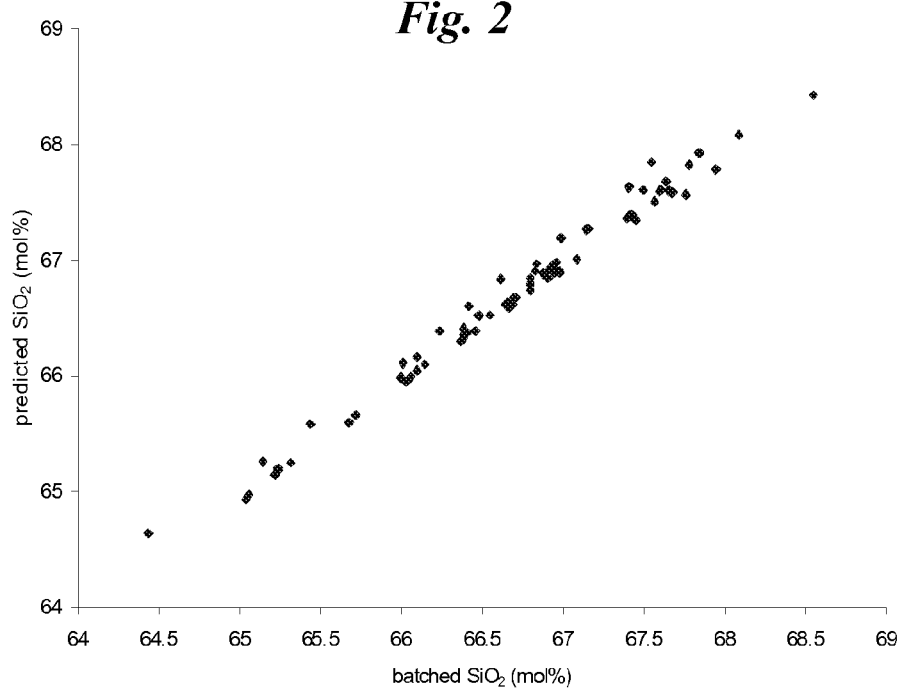
FIG. 2 is a graph of predicted $SiO_2$ content vs. measured $SiO_2$ content for a variety of glasses in accordance with the present invention.
Figure 3:
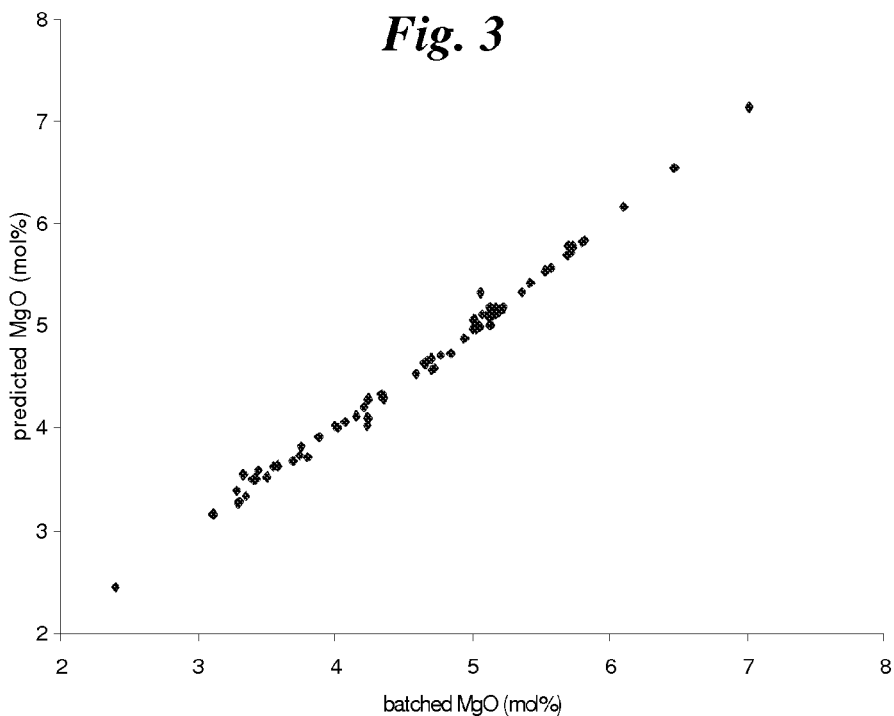
FIG. 3 is a graph of predicted MgO content vs. measured MgO content for a variety of glasses in accordance with the present invention.

FIG. 2 is a plot of $SiO_2$ concentration for various glasses of the present invention vs. $[87.46-5.85 \times MgO \times (1-B_2O_3/100) + 63.67 \times M_o - 13.85 \times S_o] \times [1-B_2O_3/100]$, the predictive measure for $SiO_2$. FIG. 3 is a plot of MgO for various glasses of the present invention vs. $[1.01+12.77 \times R_o - 13.79 \times S_o] \times [1-B_2O_3/100]$, the predictive measure for MgO. As FIGS. 2 and 3 show, the actual concentrations of MgO and $SiO_2$ lie very close to the predicted values for all compositions.

Figure 4:
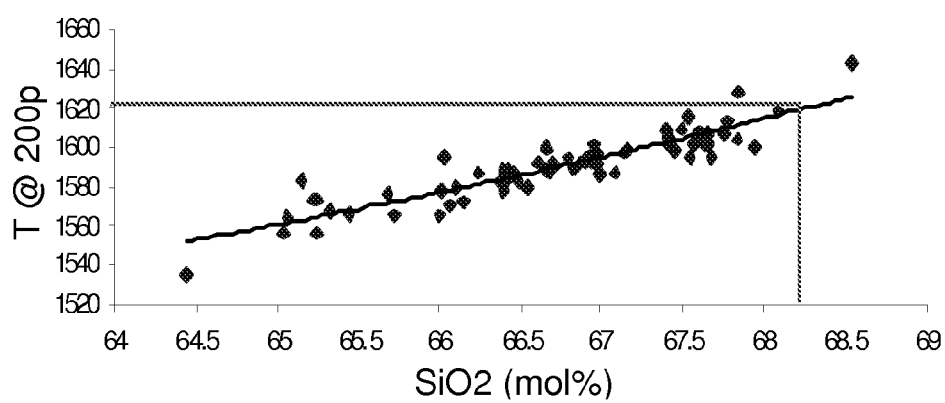
FIG. 4 is a graph of melting temperature of various glasses of the present invention as a function of $SiO_2$ content.

FIG. 4 is a graph of melting temperature of various glasses of the present invention as a function of $SiO_2$ content. As FIG. 4 shows, the melting temperature increases as a relatively steep function of $SiO_2$ content for glasses that otherwise satisfy the expressions: $11 \le Al_2O_3 \le 13.5$; $5 \le B_2O_3 \le 9$; $2 \le MgO \le 9$; $3 \le CaO \le 9$; and $1 \le SrO \le 5$. Accordingly, it is believed that, when $SiO_2$ content is above 68.2 mol %, melting temperatures higher than 1620° C. may result, particularly in compositions that do not contain arsenic.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention, as defined in the claims which follow.

The invention claimed is:

1. An alkali-free glass having a liquidus viscosity of greater than or equal to about 90,000 poises, a melting temperature less than or equal to about 1620° C., and an anneal point greater than or equal to about 725° C., said glass comprising $SiO_2$, $Al_2O_3$, $B_2O_3$, MgO, CaO, SrO, $SnO_2$, and $Fe_2O_3$, such that, in mole percent on an oxide basis: $64 \leq SiO_2 \leq 68.2$; $11 \leq Al_2O_3 \leq 13.5$; $5 \leq B_2O_3 \leq 9$; $2 \leq MgO \leq 9$; $3 \leq CaO \leq 9$; $1 \leq SrO \leq 5$; $0.02 \leq SnO_2 \leq 0.3$; and $0.005 \leq Fe_2O_3 \leq 0.08$; wherein:
(i) the glass comprises less than 0.05% by weight of $Sb_2O_3$, $As_2O_3$, or combinations thereof;
(ii) the BaO content of the glass on an oxide basis is less than 1000 ppm by weight; and
(iii) the glass is in the form of a plate produced by a fusion draw process.

2. An alkali-free glass according to claim 1 wherein said glass has a liquidus viscosity of greater than or equal to about 100,000 poises and a liquidus temperature of lower than or equal to about 1200° C.

3. An alkali-free glass according to claim 1 wherein said glass has a linear coefficient of thermal expansion over the temperature range of 0° C. to 300° C. of less than or equal to about $40 \times 10^{-7}$/° C.

4. An alkali-free glass according to claim 1, wherein, in mole percent on an oxide basis:

$11.3 \leq Al_2O_3 \leq 13.5$.

5. An alkali-free glass according to claim 1, wherein, in mole percent on an oxide basis:

$1.05 \leq (MgO+CaO+SrO)/Al_2O_3 \leq 1.45$;

$0.67 \leq (SrO+CaO)/Al_2O_3 \leq 0.92$; and $0.45 \leq CaO/(CaO+SrO) \leq 0.9$;

and the glass has a liquidus temperature of lower than or equal to about 1200° C.

6. An alkali-free glass according to claim 1, wherein, in mole percent on an oxide basis:

$1.05 \leq (MgO+CaO+SrO)/Al_2O_3 \leq 1.3$;

$0.72 \leq (SrO+CaO)/Al_2O_3 \leq 0.9$; and $0.55 \leq CaO/(CaO+SrO) \leq 0.9$.

7. An alkali-free glass according to claim 1, wherein, in mole percent on an oxide basis:

$1.05 \leq (MgO+CaO+SrO)/Al_2O_3 \leq 1.3$;

$0.72 \leq (SrO+CaO)/Al_2O_3 \leq 0.9$; and $0.8 \leq CaO/(CaO+SrO) \leq 0.9$.

8. An alkali-free glass according to claim 1 wherein the glass contains one or more of $CeO_2$, and Br.

9. An alkali-free glass according to claim 1, wherein:

$F+Cl+Br \leq 0.4$.

10. An alkali-free glass according to claim 1, wherein said glass has a liquidus viscosity of greater than or equal to about 100,000 poises.

11. An alkali-free glass according to claim 1, wherein said glass has a liquidus viscosity of greater than or equal to about 130,000 poises.

12. An alkali-free glass according to claim 1, wherein said glass has a liquidus temperature of lower than or equal to about 1200° C.

13. A glass substrate, such as a display glass substrate, comprising an alkali-free glass according to claim 1.

14. A glass substrate according to claim 13, wherein the alkali-free glass is substantially defect-free.

15. A flat panel display device comprising a flat, transparent glass substrate carrying polycrystalline silicon thin film transistors, wherein said glass substrate comprises an alkali-free glass according to claim 1.

* * * * *